(12) United States Patent
Leicher et al.

(10) Patent No.: US 9,774,581 B2
(45) Date of Patent: Sep. 26, 2017

(54) IDENTITY MANAGEMENT WITH LOCAL FUNCTIONALITY

(71) Applicant: InterDigital Patent Holdings, Inc., Wilmington, DE (US)

(72) Inventors: Andreas Leicher, Frankfurt (DE); Yogendra C. Shah, Exton, PA (US); Vinod K. Choyi, Norristown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 524 days.

(21) Appl. No.: 13/745,004

(22) Filed: Jan. 18, 2013

(65) Prior Publication Data
US 2013/0191884 A1 Jul. 25, 2013

Related U.S. Application Data

(60) Provisional application No. 61/589,125, filed on Jan. 20, 2012.

(51) Int. Cl.
*H04L 29/08* (2006.01)
*H04L 29/06* (2006.01)
*H04W 12/06* (2009.01)

(52) U.S. Cl.
CPC .......... *H04L 63/08* (2013.01); *H04L 63/0815* (2013.01); *H04W 12/06* (2013.01); *H04L 2463/081* (2013.01)

(58) Field of Classification Search
CPC ............... H04L 63/08; H04L 2463/081; H04L 63/0815; H04W 12/06
USPC .................................. 726/4, 9; 713/172, 193
See application file for complete search history.

(56) References Cited

U.S. PATENT DOCUMENTS 8,402,526 B2  3/2013  Ahn
2009/0271847 A1  10/2009  Karjala et al.
(Continued)

FOREIGN PATENT DOCUMENTS

JP  2004-260716  9/2004
JP  2010-244272  10/2010
(Continued)

OTHER PUBLICATIONS

Shigetomi et al., Anonymous Authentication Scheme for Xml Security Standard with Refreshable Tokens, Oct. 31, 2003, ACM, pp. 86-93.*

(Continued)

*Primary Examiner* — Luu Pham
*Assistant Examiner* — Jenise Jackson
(74) *Attorney, Agent, or Firm* — Baker & Hostetler LLP

(57) ABSTRACT

A user equipment (UE) may perform functions locally, such as on a trusted module that resides within the UE. For example, a UE may perform functions associated with a single sign-on protocol, such as OpenID Connect for example, via a local identity provider function. For example, a UE may generate identity tokens and access tokens that can be used by a service provider to retrieve user information, such as identity information and/or user attributes. User attributes may be retrieved via a user information endpoint that may reside locally on the UE or on a network entity. A service provider may grant a user access to a service based on the information that it retrieves using the tokens.

19 Claims, 14 Drawing Sheets

(56) References Cited

U.S. PATENT DOCUMENTS

| | | | |
|---|---|---|---|
| 2009/0300746 A1* | 12/2009 | Ahn | 726/9 |
| 2010/0251353 A1* | 9/2010 | Hodgkinson | 726/9 |
| 2011/0173105 A1* | 7/2011 | Schirilla et al. | 705/34 |
| 2011/0213969 A1* | 9/2011 | Nakhjiri et al. | 713/158 |
| 2011/0282697 A1* | 11/2011 | Fitzgerald et al. | 705/4 |
| 2012/0144034 A1* | 6/2012 | McCarty | 709/225 |
| 2012/0167186 A1* | 6/2012 | Dietrich | 726/6 |
| 2012/0254957 A1* | 10/2012 | Fork et al. | 726/6 |
| 2012/0304312 A1* | 11/2012 | Dong | 726/28 |
| 2013/0219181 A1* | 8/2013 | Schwarz et al. | 713/175 |
| 2015/0256531 A1 | 9/2015 | Dietrich et al. | |

FOREIGN PATENT DOCUMENTS

| | | |
|---|---|---|
| JP | 2011-510387 | 3/2011 |
| KR | 2011-0008272 A | 1/2011 |
| WO | WO 2011-006790 | 1/2011 |
| WO | WO 2011/031272 A1 | 3/2011 |
| WO | WO 2011-100331 | 8/2011 |
| WO | WO 2012-004916 | 1/2012 |

OTHER PUBLICATIONS

Hernandez et al, Virtual Identities in Authentication and Authorization Scenarios, Nov. 1, 2006, ACM, pp. 1-4.*

Almuhaideb et al, Two-Party Mobile Authentication Protocols for Wireless Roaming Networks, 2011, IEEE, pp. 285-288.*

Narges et al, An Identity-Based Network Access Control Scheme for Single Authority, 2010, IEEE, pp. 462-468.*

Daisuke Mashima et al, "User-Centric Handling of Identity Agent Compromise", Sep. 21, 2009, Computer Security Â Esorics 2009, Springer Berlin Heidelberg, Berlin, Heidelberg, pp. 19-36.

Haitham, S. Al-Sinani et al., "A Universal Client-Based Identity Management Tool", Sep. 15, 2011, Public Key Infrastructures, Services and Applications, Springer Berlin Heidelberg, Berlin, Heidelberg, 49-74.

N. Sakimura, "Draft: OpenID Connect Standard 1.0—draft 07", Dec. 23, 2011.

Andreas Pashalidis et al., "Single Sign-On Using Trusted Platforms", Dec. 10, 2003.

OpenID Connect Basic Client Profile 1.0-draft 26, OpenID Foundation, 2013, https://web.archive.org/web/20131023211738/http://openid.net/specs/openid-connect-basic-1_0-26.html.

Japanese Patent Application No. 2014-553445: Official Notice of Rejection dated Sep. 8, 2015, 11 pages.

Korean Application No. 10-2016-7017358: Korean Office Action dated Sep. 22, 2016, 7 pages—as translated in English.

Korean Application No. 10-2016-7017358: Notice of Allowance dated Jan. 19, 2017, 1 page.

* cited by examiner

IDENTITY MANAGEMENT WITH LOCAL FUNCTIONALITY

CROSS REFERENCE TO RELATED APPLICATIONS

This application claims the benefit of U.S. Provisional Patent Application Ser. No. 61/589,125, filed Jan. 20, 2012, the contents of which are hereby incorporated by reference in their entirety.

BACKGROUND

Mobile devices are increasingly used to access internet services. Often internet services require secure transactions to protect sensitive data. Such security measures often impose identity and authentication burdens on the user in the form of data requirements such as usernames, pins, and/or passwords. Wireless telecommunications networks may implement various forms of authentication. Service providers may also seek various user attributes to authenticate a user, identify a user, and/or determine a user's level of access to a web service.

Single sign-on (SSO) solutions have been proposed that aim to make user authentication less cumbersome for a user. The OpenID protocols are one example of protocols that make single sign-on possible. The OpenID 2.0 protocol and the more recent OpenID Connect protocol are the most prevalent of the OpenID protocols. Hereinafter, the term "OpenID protocol" alone is meant to cover any of the various forms of OpenID protocols, including OpenID 2.0 and OpenID Connect. If a particular protocol is to be discussed, it will be specifically identified.

Often current approaches to SSO, such as the OpenID protocols, require a network identity provider to implement various SSO mechanisms. These approaches may give the user limited control over his/her identity information as it is handled by a SSO identity provider, and may result in user data and communications that are vulnerable to security attacks.

SUMMARY

Systems, methods, and apparatus embodiments are described herein for implementing identity management mechanisms, such as mechanisms associated with an OpenID Connect protocol for example, on a user equipment (UE). In an example embodiment, a user equipment (UE) and a service provider (SP) may communicate via a network. A user of the UE may request access to a service that is provided by the SP. The SP may request an identity (ID) token to authenticate the identity of the user and/or the UE. The UE may create an ID token in accordance with the request. For example, the ID token may be created securely in a trusted environment that resides within the UE. Such a trusted environment may be implemented by a universal integrated circuit card (UICC), a trusted module, a secure environment, or the like, or any appropriate combination thereof. The UE, via the trusted environment for example, may issue the ID token to the SP. The ID token may be verified in order to provide the UE access to the service that is provided by the SP. The UE may also create an access token in response to receiving an authorization request that is approved by the user. The access token may be related to the service being requested by the UE from the SP. Thus, the access token may be associated with the user approval of the authorization request. For example, the SP may issue an authorization request in order to receive additional information about the user, such as a user attribute for example. The UE may issue the access token to the SP, and the SP may receive user attributes that it requested upon a verification of the access token. The ID tokens and the access tokens may be generated at the UE in accordance with the OpenID Connect protocol. For example, the token may be generated securely in a trusted module that resides within the UE.

In another example embodiment, a UE may provision an access token that is related to a service being requested by a SP. Such an access token may be redeemed by the SP that provides the requested service. The UE may generate the access token in response to receiving a request for user data. An access token may comprise information that is indicative of a location of a user information endpoint. For example, a SP may use the location to retrieve user data from the user information endpoint. The user information endpoint may provide a requested user attribute to the SP upon a verification of the access token. The user information endpoint may be located on a trusted module within the UE, a network entity that communicates with the SP via a network, or a combination thereof. For example, a UE may create a first access token and a second access token which are associated with a service and a user of the UE. The first access token may comprise information indicative of a location of a first user information endpoint that provides a first requested user attribute to the SP upon a verification of the first access token. The second access token may comprise information indicative of a location of a second user information endpoint that provides a second requested user attribute to the SP upon a verification of the second access token. The first user information endpoint may be located on the UE, such as on a trusted module for example, and the second user information endpoint may be located on a network entity that communicates with the SP via the network. For example, the first requested user attribute provided by the first user information endpoint may be classified as confidential data by the user, and the second requested user attribute provided by the second user information endpoint may be classified as nonconfidential data by the user. In order to serve the UE/user, the SP may combine the first and second user attributes which have different security classifications and which are obtained from their respective user information endpoints.

In an alternative embodiment, the access token can be redeemed by other parties, besides or in addition to the SP, that receive the token.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
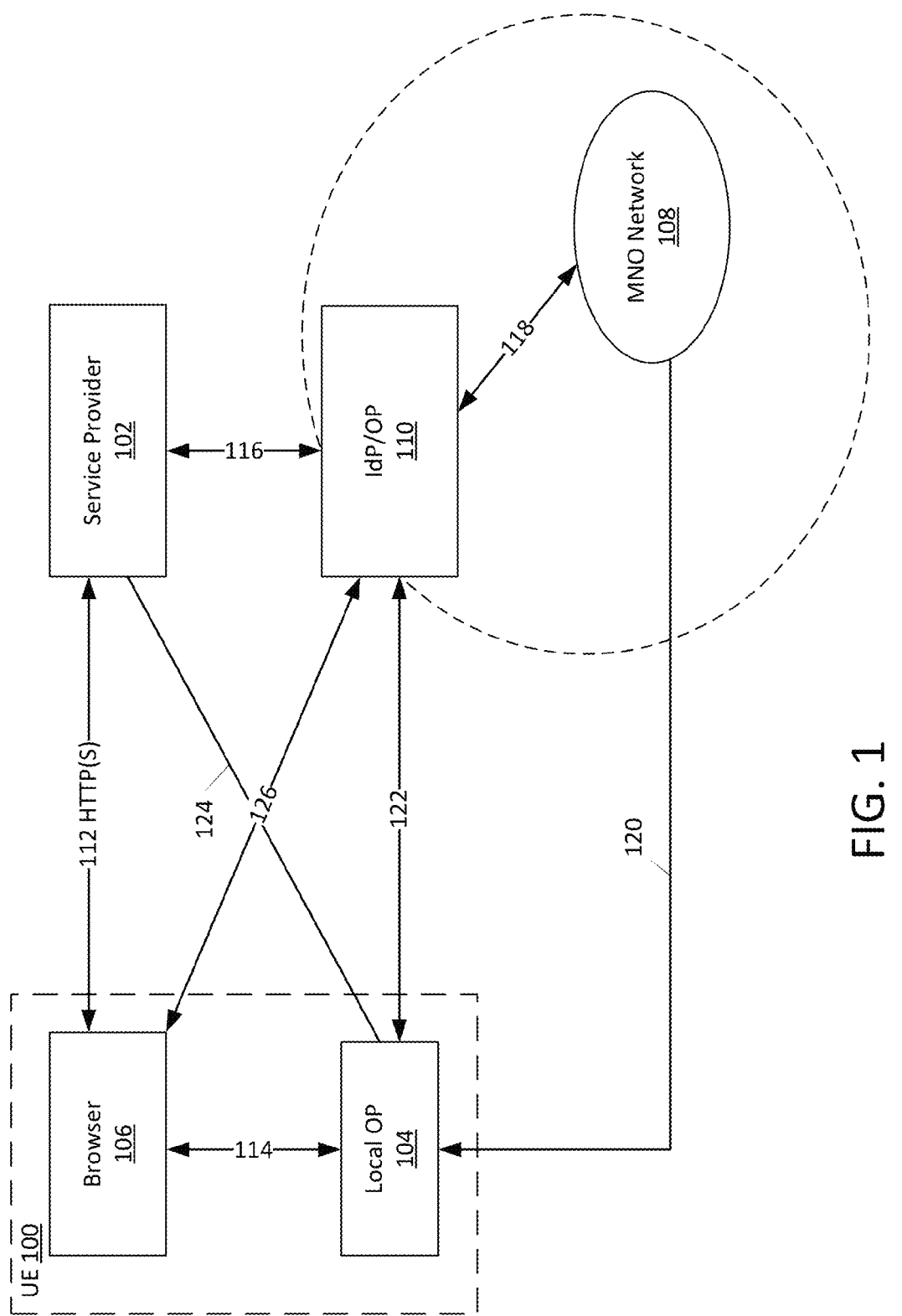
FIG. 1 is a block diagram illustrating example interfaces in a network.

The ensuing detailed description is provided to illustrate exemplary embodiments and is not intended to limit the scope, applicability, or configuration of the invention. Various changes may be made in the function and arrangement of elements and steps without departing from the spirit and scope of the invention.

Various methods and systems are described herein for managing the identity of a user and/or a user equipment (UE). While the embodiments herein may be described in the context of the OpenID Connect protocol, embodiments are not limited to implementing the OpenID Connect protocol, and may implement other single sign-on (SSO) protocols and/or federated identity protocols for example. Similarly, while OpenID entities may be used as references herein, embodiments are not limited to OpenID entities, and the OpenID entities may be extendable to other entities that perform the same, or similar, functions as OpenID entities. For example, as used herein, the terms relying party (RP) and client may refer to a service provider (SP), such as a service website. The terms OpenID identity provider (OP) and authorization server may refer to a network identity provider (IdP) or an authentication endpoint (AEP). The term user equipment (UE) may refer to any appropriate wireless transmit/receive unit (WTRU), as further described herein.

In one example embodiment, authentication functionality of an authentication endpoint (e.g., an OP server) may be implemented by a local security module that resides within the UE. For example, a local agent (e.g., a trusted environment such as a security module, a trusted module, or the like) of a mobile device may act as a proxy for a network side identity provider. The local security module may be used to perform functions that may authenticate and/or authorize an end user of the UE. A local security module may be referred to as a local identity provider and may be used to authenticate an end user based on an OpenID protocol, such as OpenID Connect for example. The term local OpenID may be used to indicate a subset of local SSO implementations in which the implementation of SSO and/or identity management is in accordance with an OpenID protocol, such as OpenID Connect for example. For example, local OpenID may be used to indicate the functions of an OP that may be performed by a locally located entity or trusted environment. Local OP is a term that may be used to indicate the entity or module that performs functions or a subset of functions of an OpenID server (e.g., an authorization server) locally on a device.

A local OP may utilize protocol flows that are based on tokens according to an example embodiment. Such tokens may be issued to a SP (e.g., a RP). Tokens may be used to retrieve information (e.g., attributes) about a user from an identity provider and/or from user information endpoints. As used herein, a user attribute may refer to any information element that is associated with a user. Example user information (e.g., attributes) includes, without limitation, a user's age and address, and such attributes may be retrieved by a SP using tokens. For example, a SP may retrieve information using tokens without the tokens carrying the information.

Embodiments described herein may use tokens for authentication. Various identifiers may be used, such as URLs and/or email addresses for example. Authentication protocols, such as OpenID Connect for example, may facilitate the secure exchange of user attributes and/or identity information.

FIG. 1 shows a block diagram that illustrates example communication interfaces according to an example embodiment. A mobile device, such as the UE 100, may be connected to the internet without being directly addressable on the public internet. In an example scenario, the UE 100 and services and/or applications which are running on the UE 100 may not be reached by outside entities, such as a web service provider 102 for example. Local services on the UE 100, such as the local OP 104 for example, may be reached via a browser 106 on the UE 100 and/or by a management back-end system of a mobile network operator (MNO) 108. Local services may be accessed via over-the-air (OTA) management, for example, if the local OP 104 is issued by the MNO 108 and installed on a SIM card. Some web services, such as a service provider 102 for example, may directly communicate with services running on the UE 100.

In an example configuration in which the UE 100 is connected to the internet via the MNO network 108, exemplary communication paths/interfaces may be identified in accordance with the illustrated embodiment of FIG. 1. At the interface (IF) 112, a browser 106 in the UE 100 may contact a web-based service (e.g., SP 102), for example, by using HTTP(S) requests. The SP 102 may answer HTTP requests and/or send responses to the browser 106. In an example scenario, a SP 102 may be unable to initiate a communication with the browser 106 before receiving a request. The IF 114 may be available to a browser 106 and an internal local OP 104. The browser 106 may communicate with a local OP 104 that resides within the UE 100, for example, via HTTP(S) and/or via a middleware software entity, such as a Java Applet, a Javascript widget, an OS API, or the like. The local OP 104 may respond to a request from a browser, an application, and/or an API, for example, with an HTTP response. In an example configuration, the local OP 104 may not be able to initiate a communication with the browser 106 before receiving a request.

The IF 116 may be referred to as a back-channel. Using the back-channel 116, the SP 102 may contact an IdP server 110 (e.g., using HTTP) and/or IdP servers 110 may contact service providers 102 (e.g., using HTTP). Communication via the IF 116 may occur without involving the browser 106 or the user's device 100. The IF 118 may be available to an IdP 110 and an MNO network 108. As indicated by dashed ellipse in FIG. 1, the IdP 110 may stand-alone or may be part of the MNO network 108. The IdP server 110 may be reached by internal entities of the MNO network 108 (e.g., using HTTP and/or proprietary interfaces). The IdP server 110 may be able to communicate with internal entities of the MNO network 108. In an example configuration, whether the IdP server 110 may communicate with internal entities of the MNO network 108 may depend on MNO firewall rules and/or policies. The IF 120 may be referred to as the over-the-air (OTA) management interface 120. The OTA interface 120 may be available to the MNO network 108 and the local OP 104. For example, the entities in the MNO network 108 may use the OTA management interface 120 to communicate with the application on a UICC/SIM card. Connections from an application of the local OP 104 to entities on the MNO network 108 may be subject to MNO firewall rules. The IF 122 may be available or may be unavailable to the local OP 104 and/or the IdP server 110, for example, depending on ownership of the application of the local OP 104 and/or the IdP 110. For example, a direct communication channel (e.g., using SMS, OTA, etc.) between both entities (e.g., local OP 104 and IdP 110) of the IF 122 may be established when both entities are operated and/or owned by the MNO and/or with consent from the MNO. In an example configuration, the MNO may enable the communication channel at the IF 122. The communication IF 124 may be unavailable between the SP 102 and the local OP 104. Direct communication from the service provider 102 to the UE 100 or the local OP service 104 running on the UE 100 may not be available, for example, when the UE 100 is not publicly addressable. The IF 126 may be available to the browser 106 and the IdP 110. For example, the browser 106 may reach the IdP 110 via HTTP requests. The IdP server 110 may respond to the browser's 106 HTTP requests.

Interface availability, such as the ability to communicate via the IF 122 for example, may depend on control of the communication endpoints and/or the communication path between the endpoints. In an example configuration, the IF 122 may be available when the OP 110 and the local OP 104 are under control of the MNO and the communication between the OP 110 and the local OP 104 is realized over a physical communication path between the SP 102 and local OP 104.

In an example embodiment, the local OP 104 may issue tokens to a SP 102. The tokens may be presented by the SP 102 to the network IdP/OP 110. Such tokens may be used to retrieve data. In the example configuration in which a communication interface is not available for the SP 102 to present a token to the local OP 104, the network IdP/OP 110 may verify that the token is issued by a legitimate local OP 104. The IdP/OP 110 may also determine whether the token is valid. For example, determining whether a token is valid may comprise verifying that the token has not expired.

Still referring to FIG. 1, indirect communication from the SP 102 to the local OP 104 may occur via the browser 106 of the UE 100, for example, by means of redirect messages. The SP 102 may send an HTTP 3xx message comprising the URL to redirect the browser 106. For example, in accordance with an OpenID protocol, the URL may be the URL that corresponds to the IdP authentication endpoint (AEP). The IdP authentication endpoint may be known to the SP 102 through a discovery mechanism, for example. The UE 100 may resolve the URL to the internet protocol (IP) address of a server of the AEP. For example, a UE 100 that has a local OP 104 that is installed on the UE 100 may resolve the URL to the local IP address of the local OP server 104.

Figure 2:
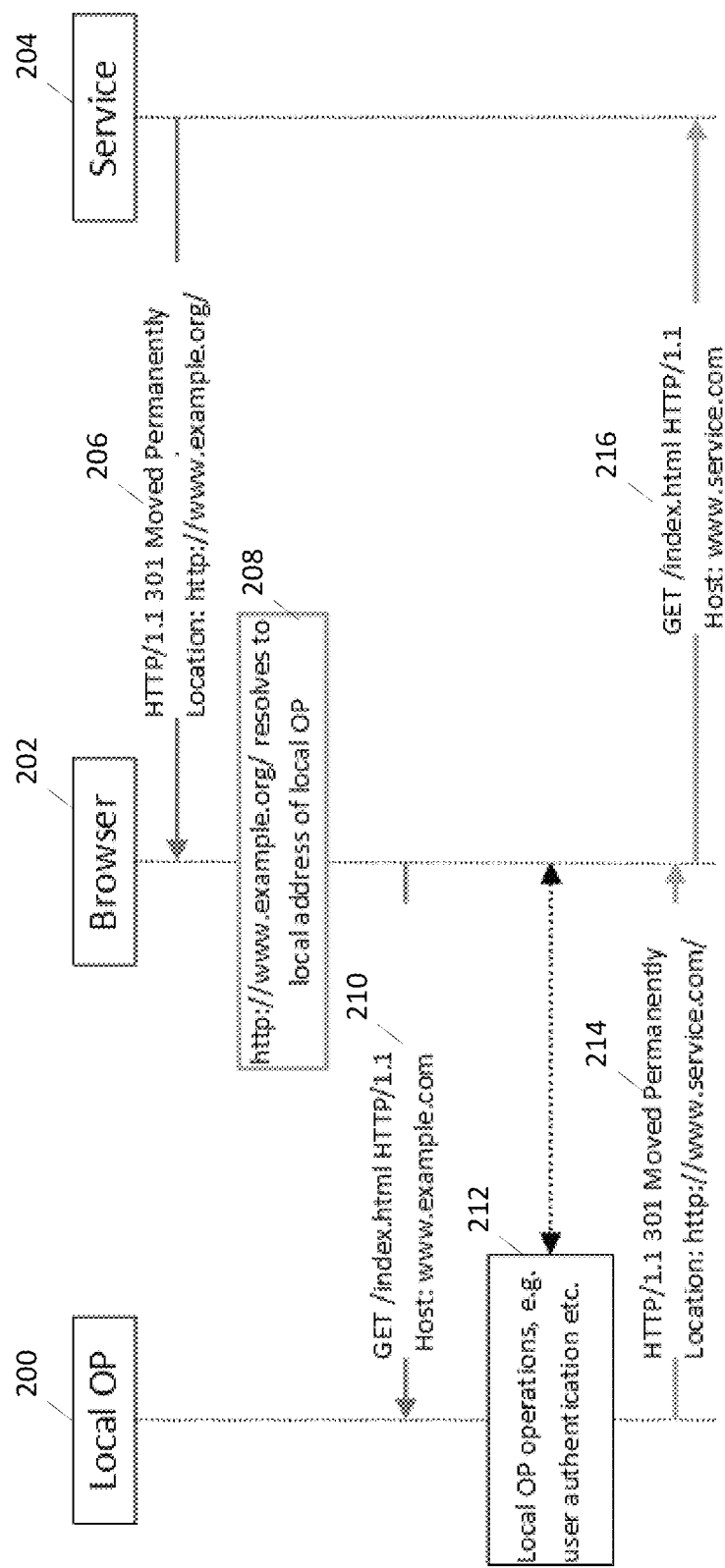
FIG. 2 is a flow diagram of an OpenID protocol with HTTP redirect messages according to an example embodiment.

FIG. 2 is a flow diagram that illustrates example HTTP redirect messages. The information flows in FIG. 2 may be implemented with indirect communication that may be used when implementing an OpenID protocol. A browser 202 of a UE may initiate communications with a SP 204 by requesting access to a service that is provided by the SP 204. The request may comprise an HTTP request to access the service. At 206, the SP 204 may respond to the request and may send data to a local OP 200 as part of a redirect message at 206 (e.g., data may be passed in parameters of an HTTP message). At 208, the browser 202 may resolve to the local address of the local OP 200. The browser 202 may follow the redirect message that it received at 206 to the local OP 200, for example, by sending a message at 210. For example, the browser 202 may follow the redirect via a modification to the DNS lookup and/or helper software (e.g., a Java Applet). For example, DNS resolution of a URL/address may occur via a host file and/or may be facilitated by a Java applet supplicant. At 212, local OP operations may occur. For example, at 212, the user of the UE may be authenticated with the UE. At 214 and 216, the local OP 200 may pass information to the SP 204, for example, via another redirect (at 214) that may send the browser 202 to the SP 204 (at 216). Information and/or data may be passed in parameters of an HTTP message. In an example configuration, direct communication from the SP 204 to the local OP 200 may not be available.

The OpenID Connect protocol enables clients of various types, such as browser-based, mobile, and/or javascript clients for example, to request and receive information about identities and authentication sessions. In various example implementations of OpenID Connect, identity data may be encrypted, an OP may be discovered, and advanced session management (e.g., logout) may be enabled. In an example implementation of OpenID Connect, a user identifier may be based on email addresses and/or URLs. A service provider may be allowed to access user owned content and/or profile data, for example, when authorization is obtained from the user (e.g., via an OAuth based call flow).

In accordance with an example implementation of an OpenID 2.0 protocol, a client secret (e.g., a shared secret between the Identity Provider (IdP/OP) and the SP/Client) may be established for each user (e.g., per authentication protocol run). The shared secret may be established between an OP and a service during a discovery process. For example, the shared secret may be derived from a long term secret and/or it may calculated by the local OP instance. In accordance with an example implementation of an OpenID Connect protocol, the client secret may comprise tokens. For example, an identity (ID) token may be signed by the OP and the client may verify the token (e.g., with the help of the OP provided token endpoint) and/or the client may verify the token signature on its own. In an example embodiment, the OP may provide keys during the discovery and/or registration processes. Registration may be performed between the client and the OP, for example, after discovery. In an example configuration, the registration protocol steps may not be specific to a user. For example, the keys may be used to sign the tokens and the keys may be generic keys for multiple users. In an example embodiment, the tokens and their signatures may be created by the local OP. For example, keys may be available to the local OP and the OP may use the keys to create the signatures.

Figure 3:
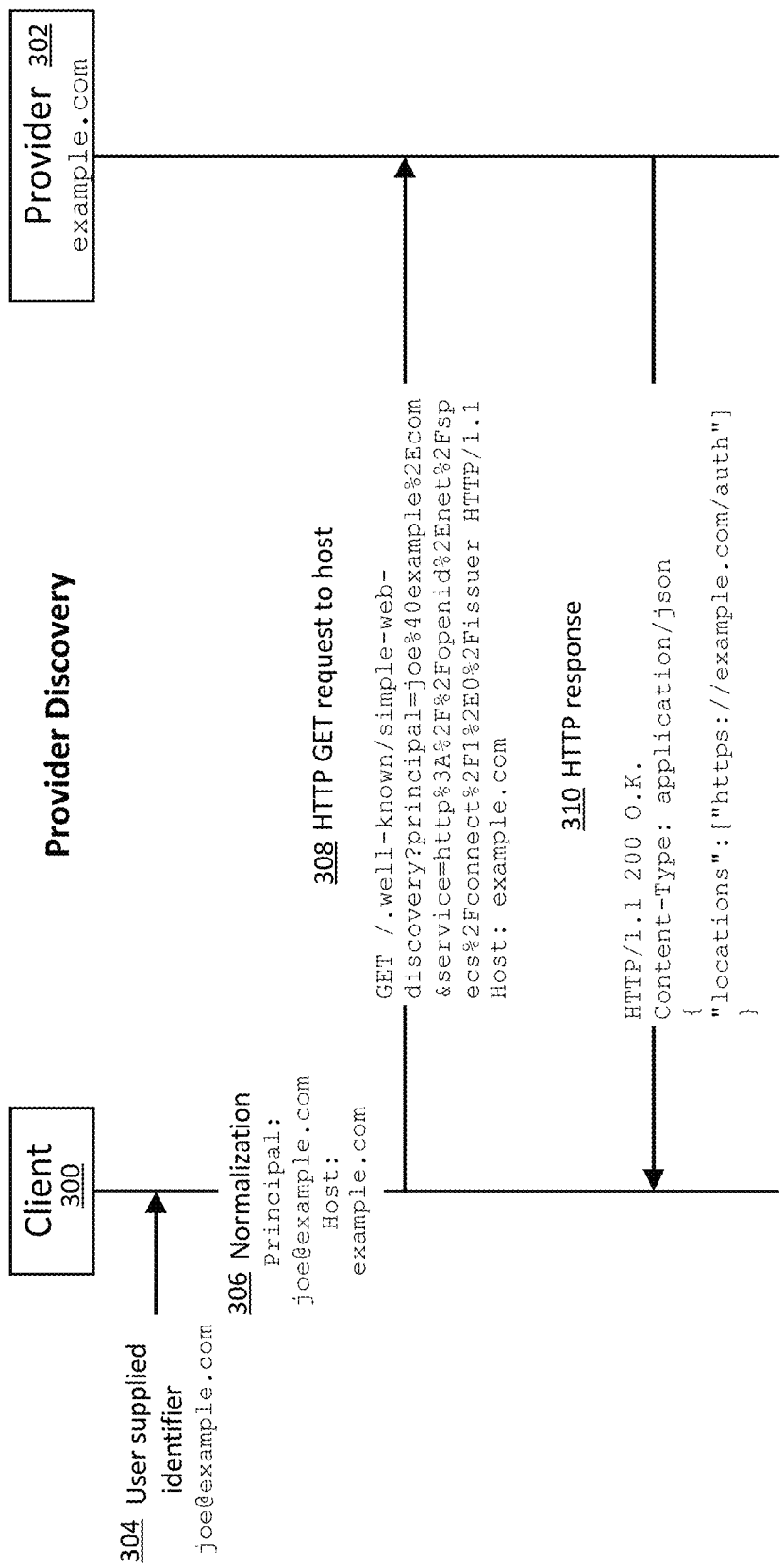
FIG. 3 is a flow diagram illustrating an exemplary discovery process according to an example implementation of an OpenID Connect protocol.

FIG. 3 shows an example discovery process according to an example implementation of OpenID Connect. A client 300 that may be referred to as a SP, may seek information, such as endpoint URLs for example, of an OpenID identity provider 302. The process of getting the sought-after information may be referred to as discovery. A SP may know provider information (e.g., via an out-of-band mechanism), and thus may skip discovery according to an example implementation of an OpenID protocol. In another example implementation, the client 300 may discover information using simple web discovery (SWD). In SWD, for example, a user of the UE may supply the client 300 with an identifier of the user at 306. The user may be referred to as the principal. At 306, the client 300 may identify the host of the identifier. The host may refer to the server that hosts the SWD service. Principal and/or host information may be provided by the end-user, for example, in the identifier. The identifier may be an XRI, email, URL, or the like, for example. At 306, the client 300 may apply normalization and/or extraction rules on the user supplied identifier to determine the principal and/or host. Referring to FIG. 3, for example, the principal may refer to e-mail and the host may refer to everything to the right of the '@' in the provided email address). The client 300 may request the location (e.g., URL) from the provider 302 using a HTTP GET request at 308. At 310, the OP 302 may return information comprising location information, such as the addresses of authentication endpoints and/or authorization endpoints for example.

Figure 4:
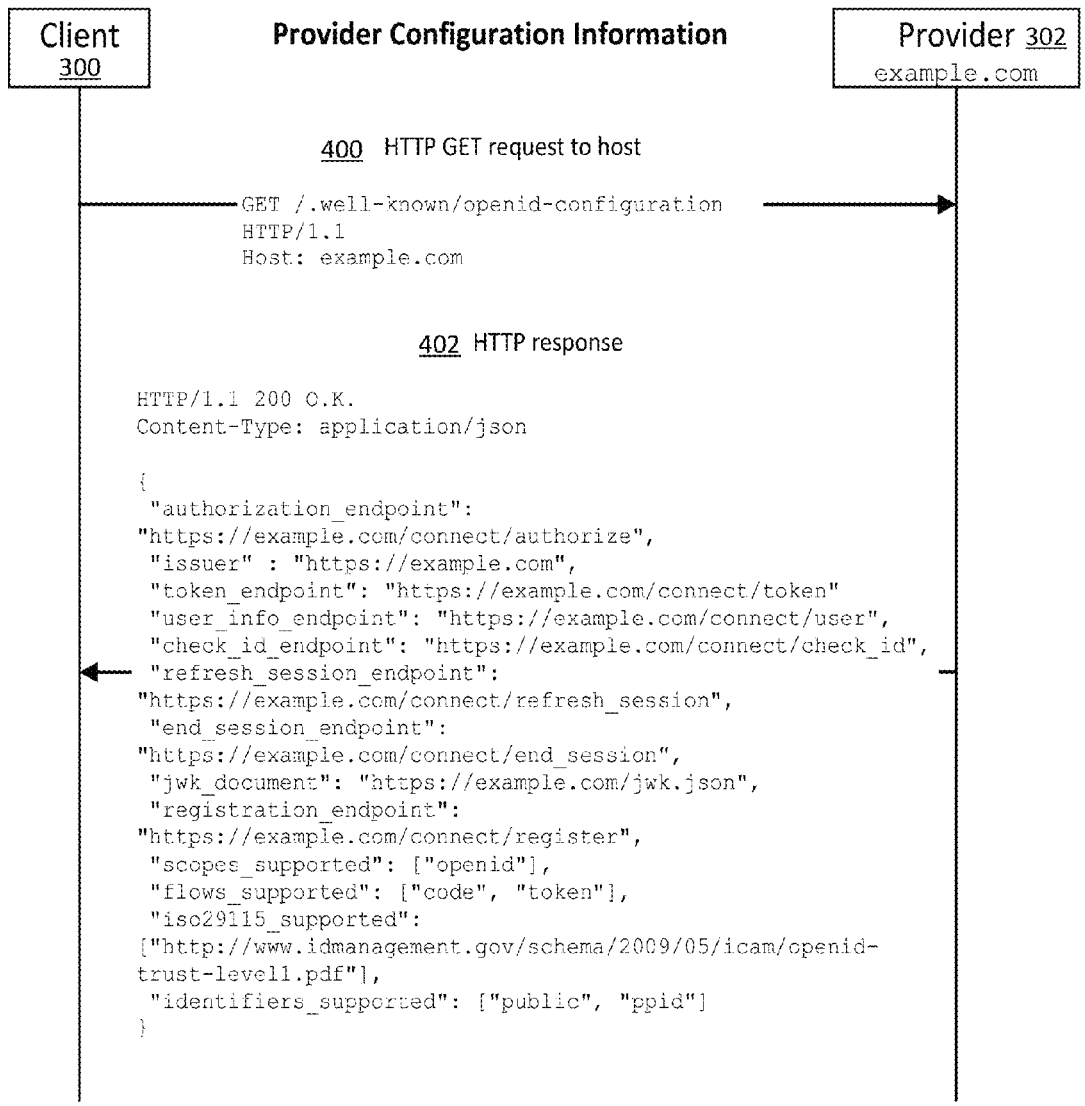
FIG. 4 is a flow diagram illustrating an exemplary protocol flow for retrieving configuration information.

As part of discovery, the client 300 may retrieve configuration information (e.g., see FIG. 4). At 400, the client 300 may request configuration information. Such configuration information may be available at an OpenID provider 302 (e.g., at the URL well-known/openid-configuration that may point to a JSON document). The communication may be secured using TLS. As a response to the request, at 402, the OpenID provider 302 may return a JSON document that may comprise attributes (e.g., information) on the configuration of the OpenID provider 302. The information may comprise information on endpoints and/or public key location information for example. For example, endpoint information may comprise URLs: of the authentication and/or authorization endpoint; of the token endpoint; of the user information (User Info) endpoint; and/or of the Check ID endpoint. A JSON web key document may comprise a URL of the provider's JSON web key (JWK) document. The JWK document may be in a JSON structure that may provide a set of public keys. Such keys may be used to sign the JSON Web Tokens (e.g., the ID token).

Figure 5:
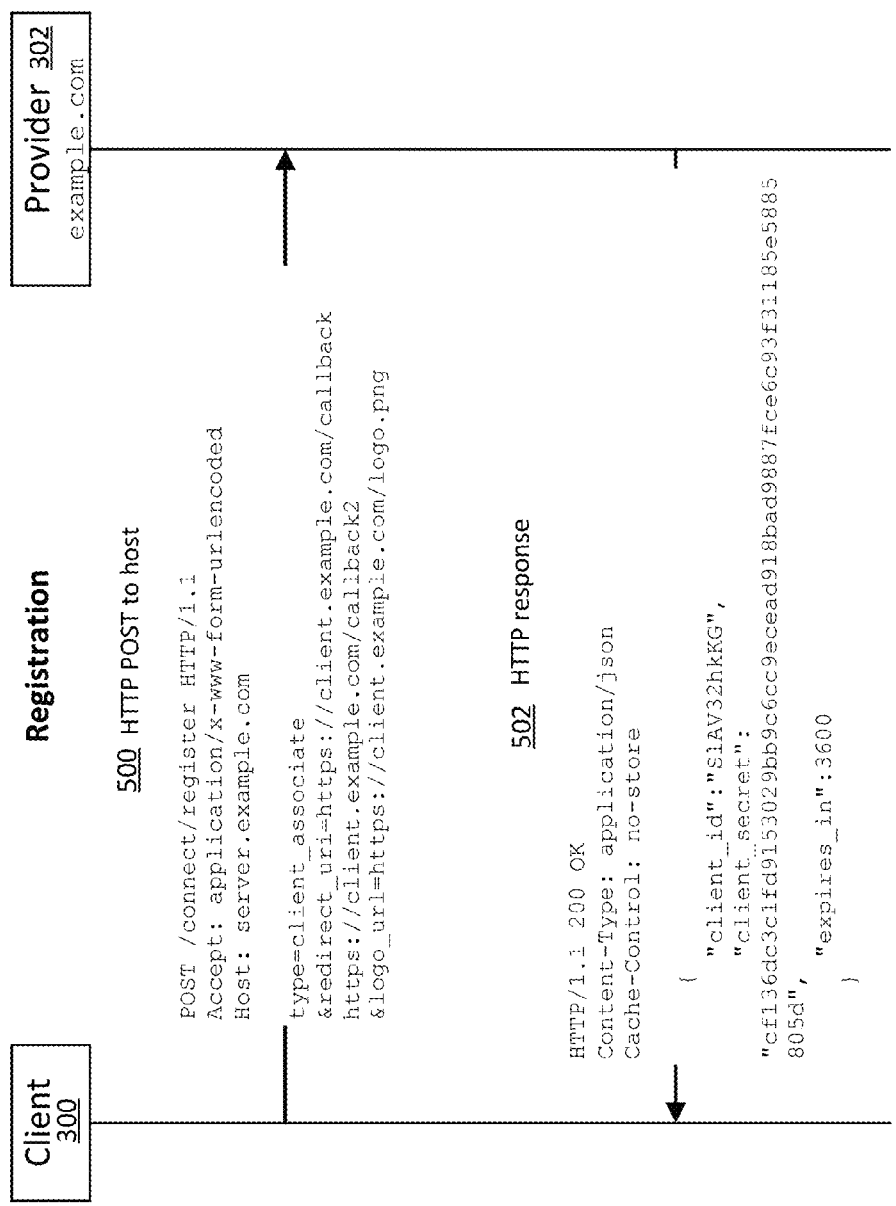
FIG. 5 is a flow diagram illustrating an exemplary registration protocol flow.

FIG. 5 shows an example registration process in accordance with an example implementation of an OpenID Connect protocol. A client 300 may register with the OpenID provider 302, for example, to get a client Id and/or a client secret. At 500, the client 300 may issue a request to the discovered registration endpoint of the provider 302. At 502, a response may be issued to the client 300. The response may comprise a JSON document. The JSON document may comprise the client Id and/or the client secret. TLS may be used to secure the communications.

With continuing reference to FIG. 5, a client secret may be established during the registration between the client/SP 300 and the IdP 302. The client secret may be used as an authentication credential for clients that may want to perform an authorization code flow. In an authorization code flow, the client may use the client secret to authenticate toward the provider's token endpoint, for example, when the client requests an access token or when the client wants to refresh an access token. According to an example implementation, an HMAC signature may be used to sign an ID token. In such an implementation, the client secret may be used as the signature key. The RP may attempt to use its stored client secret, for example, to verify token signatures if HMAC is used as a signing mechanism. For example, HMAC symmetric signatures may be used with a local OP. The local OP may know the client secret for the SP, for example, in order to create the HMAC signature.

Registration may or may not be performed when a user logs in to the client. In an example implementation of an OpenID Connect protocol, the client secret may be established per service and IdP, so that a service may have its own client secret with the IdP. In an example implementation of an OpenID 2.0 protocol, an association secret may be created for each user authentication process between the service and the IdP. The association secret may be used to sign the identity assertion message, for example, and the client may verify the signature. In the example OpenID Connect implementation, the client secret may be a client authentication credential. Thus, the role of an association secret may be implemented by the signature on the ID token. The signature on the ID token may be created using a Provider JWK key for example.

According to an example implementation of an OpenID Connect protocol, the discovery and registration processes may take place between the SP and the IdP on the network, such that availability of the client secrets and/or other information exchanged between the two entities may be restricted to the SP and the network IdP.

In various example implementations of an OpenID Connect protocol, an ID token may act as an OAuth access token. For example, an ID token may be exchanged at the OP for authentication data such as a user identifier for example. The ID token may carry encoded data. Requests for access tokens may allow service providers to access the user identifier and/or additional profile data (e.g., user attributes such as address, age, etc.). The data format of an ID token may be JWT which may comprise JSON data for example.

Embodiments described herein may use various token types such as ID tokens and/or access tokens for example. Such tokens may be implemented in accordance with an OpenID Connect protocol. For example, ID tokens may comprise information on an authentication event and may enable service providers to verify that a user has been authenticated at the IdP. In order to enable verification, for example, ID tokens may comprise encoded data. An access token may be an OAuth Bearer token for example. An access token may allow the receiving service to redeem the token (e.g., at the User Info endpoint). A service provider may redeem the access token, for example, to receive user information (e.g., user attributes/claims). Service providers may use an ID token to authenticate users. In an example embodiment, a service may request an access token to retrieve additional data that is not included in an ID token. For example, a service provider may request an access token to get data from an endpoint.

The ID token may be in a JWT format in accordance with an example implementation of an OpenID Connect protocol. A JWT may comprise JSON attributes, for example, of the actual authentication of the user. For example, an ID token may comprise the following data that may be encoded as a JWT:

iss—This may refer to a unique identifier of the issuer of the response;

user_i—This may refer to a locally unique and/or never reassigned identifier for the user, which may be intended to be consumed by the client (e.g., 24400320 or AItOawmwtWwcT0k51BayewNvutrJUqsv16qs7A4). It may not exceed 255 ASCII characters in length according to an example implementation;

aud—This may refer to the intended audience of the ID token. For example, "aud" may be the OAuth client_id of the RP;

exp—This may comprises an integer and/or may identify the expiration time on or after which the ID token may be accepted for processing. The processing of this parameter may depend on whether the current date/time is before the expiration date/time listed in the value. For example, implementers may provide for leeway, for example, to account for clock skew. The value may be a number of seconds from 1970-01-01T0:0:0 Z as measured in UTC until the desired date/time;

iso29115—This may provide entity authentication assurance. For example, this data parameter may specify the entity authentication assurance level of the authentication performed; and nonce—If the authorization request includes a nonce request value, then this value may be set to the same value as the request value.

The following illustrates example contents of a ID token, according to an example implementation an OpenID Connect protocol. The example ID token may be sent from the client to the CheckID Endpoint. The section below shows an example request from the service to the endpoint, including the example token:

```
POST /id_token HTTP/1.1
Host: server.example.com
Content-Type: application/x-www-form-encoded
id_token=eyJ0eXAiOiJKV1QiL
```

The next section shows an example of the (JSON) contents of the example token as may be returned by the endpoint to the service provider:

```
HTTP/1.1 200 OK
Content-Type: application/json
{
"iss": "http://server.example.com",
"user_id": "248289761001",
"aud": "http://client.example.com",
"exp": 1311281970
}
```

The example token may be signed and/or may be encrypted using JSON Web Signature (JWS) and/or JSON Web Encryption (JWE). Keys used for signing and/or encrypting may be JSON Web Keys for example.

Attributes in JWT may be encoded as a JSON object. The JWT may be a string with a combination of components. Example components include a JWT header segment, a JWT attribute segment, and a JWT crypto segment. The JWT header segment may comprise a base64url* encoded JSON that may describe the crypto operations applied to the header and attribute segment. The JWT attribute segment may comprise a base64url* encoded JSON object that encodes the attributes. The JWT crypto segment may comprise a base64url* encoded crypto material that secures the contents of the JWT header and attributes segments. Exemplary base64 encoding may remove trailing '=' characters.

In an example implementation of an OpenID Connect protocol, the signatures on the tokens may be valid JSON Web Token Signatures (JWS). A signed token using JWS may have a header which comprises information on the signature algorithm and/or may comprise pointers to the keys being used for the signature. The signature algorithm for the JWS may include the following algorithms, although embodiments are not limited to the following signature algorithms:

HS256 HMAC using SHA-256 hash algorithm;
HS384 HMAC using SHA-384 hash algorithm;
HS512 HMAC using SHA-512 hash algorithm;
RS256 RSA using SHA-256 hash algorithm;
RS384 RSA using SHA-384 hash algorithm;
RS512 RSA using SHA-512 hash algorithm;
ES256 ECDSA using P-256 curve and SHA-256 hash algorithm;
ES384 ECDSA using P-384 curve and SHA-384 hash algorithm; and/or
ES512 ECDSA using P-521 curve and SHA-512 hash algorithm.

As shown above, different key types may be supported, for example, based on the selected signature algorithm. In an example implementation, the RP may choose to verify the signature on the ID token itself, so the RP may need to know the verification keys. The pointer to the keys may be part of the header. For example, the pointer may be the jku (e.g., JSON Web Key URL) parameter, which may comprise a URL pointing to a set of JSON encoded public keys. In an example implementation, the x5u parameter may comprise a URL pointing to a X.509 public key certificate or certificate chain (e.g., corresponding to the key). The header parameters may be set by the entity that creates the token and the token signature. If an HMAC signature is used to sign the ID token, the client secret may be used as the signature key. An example access token may be an OAuth Bearer token for example. An example access token may be used at the user info endpoint, for example, to obtain user information (e.g., identity attributes and/or user information).

Service providers (clients) may perform the verification of ID tokens independently. For example, clients may verify tokens without contacting the issuing IdP server. The key material for verification may be received by the client in the discovery process (e.g., in the JSON Web Key URL parameter).

According to an example embodiment, service providers may treat ID tokens as opaque values and may submit them to the Check ID endpoint for verification. In such an embodiment, service providers may receive information about the user authentication from the Check ID endpoint. The signature and/or encryption on the ID token may use a JSON Web Key for example. The key may be available to the client via the JSON Web Key parameter in the registration and/or a public key (e.g., referenced in the x5u header parameter).

Figure 6:
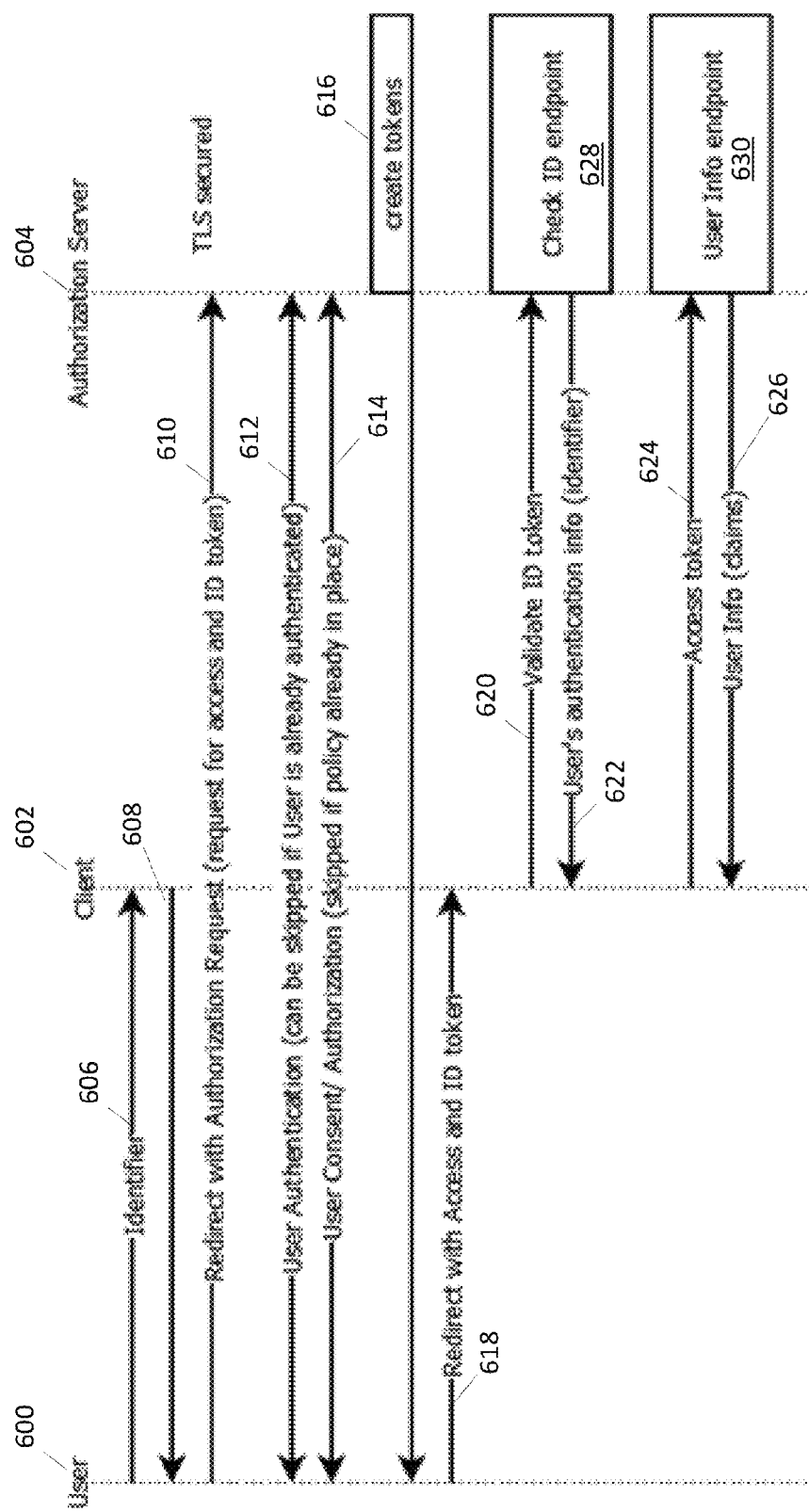
FIG. 6 is a flow diagram of an example implementation of an OpenID Connect protocol.

FIG. 6 shows an example call flow according to an example implementation of an OpenID Connect protocol. The example call flow in FIG. 6 may be used by service providers (e.g., client 602), for example, that have not registered a shared secret with an OP (e.g., authorization server 604). In an example OpenID Connect implementation in which a service provider has not registered a shared secret with the identity provider, the service provider may directly request an ID token from the identity provider, as shown at 610 of FIG. 6.

In another OpenID Connect implementation in which a service provider has registered a shared secret with the identity provider, the service provider may follow an authorization (auth) code flow (see FIG. 7) in which the service provider may receive a secure authorization code instead of a token. The auth code may be exchanged for an ID token, for example, at an identity provider. The service provider may use the pre-established shared secret (e.g., with the identity provider) to authenticate the service provider when redeeming the auth code for an ID token.

Referring again to FIG. 6, the client 602 may not have registered a secret with the authorization server 604 when a user/UE 600 requests access to a service that is provided by the client 602. At 606, a user 600 may request access to a service by using an OpenID identifier, such as an email address for example. The identifier may comprise a username and the domain of an OpenID IdP (OP). The OP may provide endpoints for discovery and authentication. At 608, the client 602 (service provider) may prepare an authorization request and may send the request to the user 600. The request may comprise desired request parameters. At 610, the authorization request may be sent to the authorization server 604 (e.g., via the user) using an HTTP re-direct for example. At 612, the authorization server 604 may authenticate the user 600, and thus the authorization server 604 may be referred to as an authentication end point (AEP). In an example configuration, the authorization server 604 may authenticate the user 400 unless the user 600 has already been authenticated and the authentication has not expired. For example, a current authentication status of the user 600 may be "true," so that the user 600 may not need to re-authenticate at 612. At 614, the authorization server 604 may obtain the consent or authorization from the user 600, for example, to allow a token to issue. In an example configuration, the user 600 may establish a policy that may avoid user consent/authorization. For example, the user 600 may have clicked a 'remember this decision' checkbox on a previous protocol run. At 616, tokens may be created and the authorization server 604 may send the user 600 back to the client 602 (at 618) with an access token and/or an ID token. In an example implementation, at 620, the client 602 may validate the ID token at the Check ID endpoint 628. At 622, the client 602 may receive an ID token response, for example, with the user's identity. At 624, the client 602 may access the User Info endpoint 630, for example, using the access token. The client 602 may receive the User Info response, such as requested user attributes for example, after accessing the User Info endpoint 630.

Figure 7:
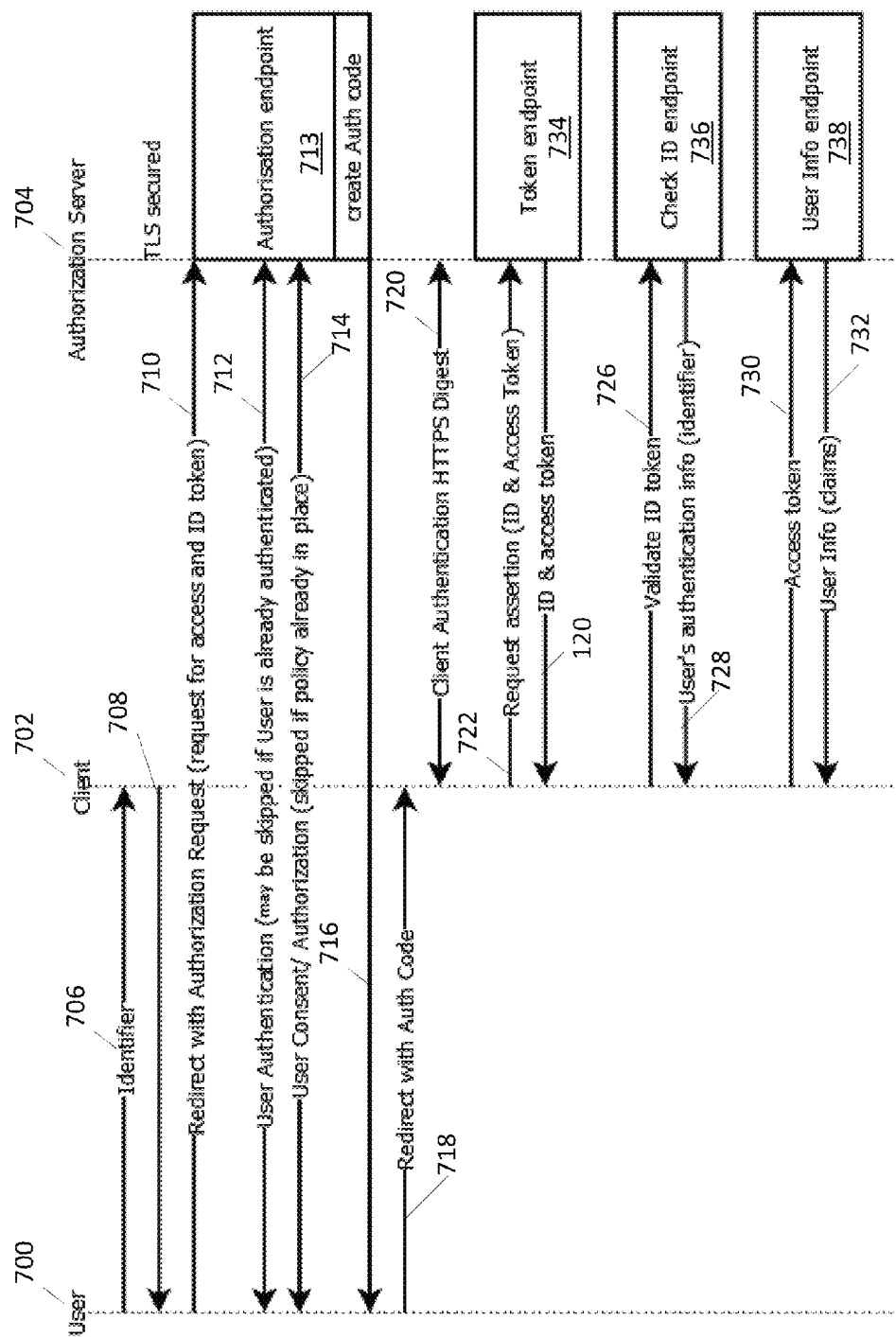
FIG. 7 is a flow diagram of an example OpenID Connect call flow using an authorization request.

Referring to FIG. 7, a service provider (e.g., client 702) may have registered a shared secret with the identity provider (e.g., authorization server 704). At 706, a user/UE 700 may request access to a service that is provided by the client 702. At 706, the access may be requested by providing an identifier of the user 700 to the client 702. Such an identifier may comprise an OpenID identifier, for example. The client 702 may prepare an authorization request that may comprise the desired request parameters, and the client 702 may send the request to the user 700, at 708. The client 702 may send the request to an authentication endpoint (AEP) 713, such as the authorization server 704 (e.g., via the user 700) using an HTTP re-direct, at 710. At 704, the AEP 713 (e.g., authorization server 704) may authenticate the user 700, for example, if the user 700 is not currently authenticated. At 714, the authorization server 704 may obtain the consent/authorization of the user 700, for example, if a policy is not in place which may have already obtained user consent/authorization. At 716, an authorization server may create an authorization (auth) code and may redirect the user 700 to the client 702, for example, with the authorization code, at 718. At 720, the client 702 may request an assertion, for example, using the authorization code at the token endpoint 734. At 724, the client 702 may receive the assertion from the token endpoint 734. The assertion may comprise an access token and/or an ID token in the response body. At 725, the client 702 may validate the ID token, for example, at the check ID endpoint 736. At 728, the client 702 may receive an ID token response from the check ID endpoint 736. Such an ID token response may comprise the identity of the end user 700. At 730, the client 702 may access the user info endpoint 738, for example, using the access token. At 732, the client 702 may receive a user info response from the user info endpoint 738. In an example implementation, a service provider (e.g., the client 702) may verify an ID token as received in step 718 and may grant access based on the identity information obtained from the ID token. The retrieval of identity attributes using the access token at the user info endpoint 738 may be an option for the client 702.

In one example embodiment, mechanisms that enable an OpenID Connect protocol to be implemented may be performed locally on a UE. For example, a user may be locally authenticated, identity attributes corresponding to a user may be locally managed, the release of identity attributes by the user may be locally authorized, and the user info endpoint may be located locally on the UE. In an example embodiment, a local trusted environment, such as a local OP for example, may securely authenticate the user, obtain authorization from the user, and/or create tokens. The locally created tokens may be used by a service provider (SP), for example, to retrieve user authentication data and/or user identity information (e.g., attributes) from respective endpoints. As described herein, a token may comprise information for a network identity provider (IdP) to verify that the token has been issued by an authorized UE and/or or an authorized local OP and the token has not expired. To determine whether a token has expired, for example, a token may be time stamped at the time of user authentication.

Figure 8:
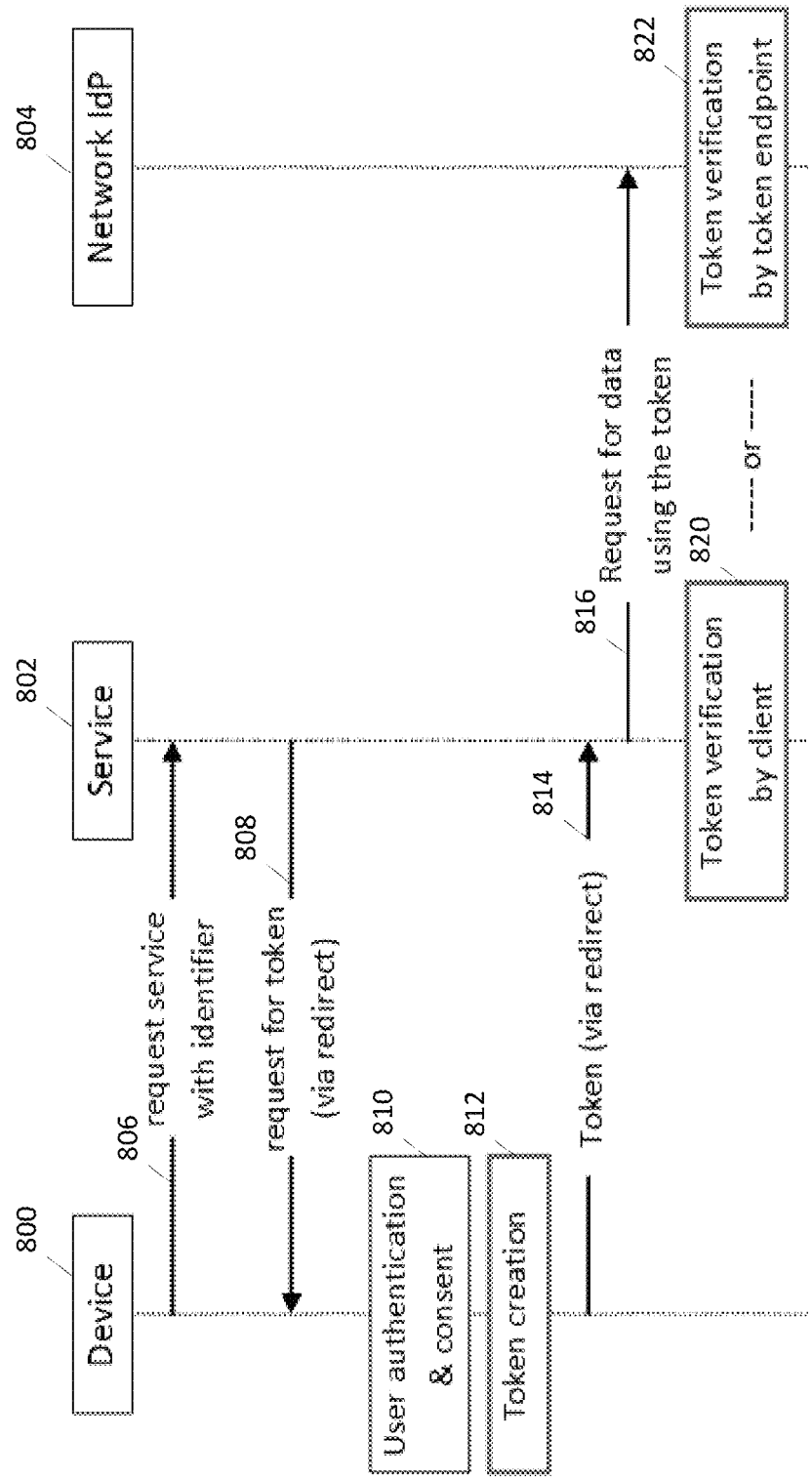
FIG. 8 is a diagram of an example call flow with local token creation according to an example embodiment.

FIG. 8 shows a flow diagram of an example protocol flow in which tokens may be created locally in accordance with an example embodiment. At 806, a UE, such as a device 800 for example, may request access to a service that is provided by the service provider 802. The request may include an identifier of a user of the device 800. At 808, the service provider 802 (client) may request a token from the device 800 via a redirect message. Thus, the UE may receive a request for a token, wherein the request for the token is responsive to a request for access to a service provided by the service provider. The request at 808 may include a request for an ID token in accordance with an OpenID Connect protocol. The request at 808 may include a request for an access token in accordance with an OpenID Connect protocol. For example, an access token may be requested by the service provider 802 so that the service provider can retrieve attributes of the user of the device 800. Attributes may relate to the user's identity. The service provider 802 may decide not to request an access token, for example, if the service provider 802 determines it does not need additional attributes or user information.

Still referring to FIG. 8, at 810, a user may give consent (approval) for the device 800 to issue a token to the service provider 802. For example, an access token may represent the consent (e.g., given by the user) that may allow the service provider 802 to access specified attribute(s) from a user information (info) endpoint. For example, a locally generated access token may comprise data that may allow the user info endpoint to identify specific attributes in which access has been granted. If, for example, the service provider 802 requests access to multiple attributes and the user consents to authorize access (at 810) to some of the requested attributes, the user info endpoint may release the authorized information and may not release attributes that have not been authorized by the user, according to an example embodiment.

For example, a UE, such as the device 800, may receive a request for user data and may receive a user consent to release a consented portion of the user data. In response to the user consent, the device 800 may generate an access token that may be associated with the service provider 802. The device 800 may issue the access token to the service provider 802, wherein the consented portion of the user data is released to the service provider 802 upon a verification of the access token. The requested user data may comprise a plurality of user attributes, wherein at least one of the plurality of the user attributes are not part of the consented portion of the user data that is released. As described further herein, a user information endpoint may reside within the device 800 according to an example embodiment, and the access token may be received at such a user information endpoint. In response to receiving the access token, the device 800 may provide the consented portion of the user data to the service provider 802.

At 812, tokens may be created on the device 800. For example, in response to the request for the token, the device 800 may create an identity token in accordance with the request for the token. In an example embodiment, tokens may be created securely on a trusted environment, such as a local OP, that resides within the device 800. An access token may be generated on the device 800 at 812. Such an access token, for example, may comprise information that allows a network entity to determine which attribute(s) may be retrieved by the service provider 802. The token may issue to the service provider 802 at 814. For example, the identity (ID) token may be issued, via a UE such as the device 800 for example, wherein the ID token is verified to provide the UE access to the service. The service provider 802 may verify the token, such as the ID token for example, at 820. In an example embodiment, the service provider 802 may check the signature on the ID token to verify that the token is valid. The key material for verification may have been received by the service provider 802 in the discovery process, such as in the JSON Web Key URL parameter for example. After the service provider 802 validates the ID token signature, the service provider 802 may check fields that are encoded in the ID token to further validate the ID token. For example, the 'iss' (issuer) field may include the unique identifier of the token issuer, such as the unique identifier of the IdP that the SP discovered from the user provided identifier. The 'aud' (audience) field may identify the audience to which the token is intended. Thus, audience field may include the client_id of the service provider 802. The 'exp' (expires) field may identify an expiration time after which the token is not accepted. In example configuration with an expiration time, if current time is after the 'exp' date and time, the corresponding ID token has expired. The service provider may verify and validate the ID token if it has not expired.

At 816, a user info endpoint, such as a network IdP for example, may be presented with the access token. The access token may comprise consent information from step 810. In an example embodiment, the service provider (SP) 802 may treat access tokens as opaque values. Such access tokens may be referred to as opaque bearer tokens that do not carry a signature. At 816, access tokens may be used towards respective token endpoints to retrieve user attributes and/or other information. Tokens may comprise an identifier of the device 800, such as an identifier of the local OP of the device 800 for example. Such identifiers may inform the network IdP 804 of a unique identity of the issuing device 800 or issuing local OP. Such an identifier of the device 800 and/or the local OP of the device 800 may be contained in the signature of a token. The identifier may allow the network IdP 804 to recognize and validate tokens that are issued by a local OP, at 822, for example. An identifier may allow token creation and token verification to occur in at least two different entities, as illustrated in FIG. 8. For example, a network entity, such as the network IdP 804, might be asked might be asked to verify the token, via the token verification endpoint 822. The endpoint 822 may verify an access token in accordance with the example steps described above for verifying an ID token. The network IdP 804 may return the result of the verification to the service provider 802. A successful verification may be required before the service provider 802 accepts the ID token and trusts its contents. For example, the service provider may not trust that an email address belongs to the current session's user until tokens are verified. Upon a successful verification, the service provider may 802 may take actions such as adding the verified user to its user database, allowing access to a service that it provides, or the like.

In an example embodiment in which a local OP issues tokens, the local OP may know a secret in order to sign the token. For example, the local OP may know secrets that have been provided to the service providers that registered in a discovery process with an IdP. As described herein, a service provider may send a token (e.g., an ID token) to the check ID endpoint. The endpoint may decode the JWT encoding and/or may verify the signature. In an example configuration, the service provider may verify the ID token without the check ID endpoint (e.g., see 820 of FIG. 8). For example, the ID token JWT may be signed with a JWK key. The key may be known to the service provider, for example, as an outcome of a discovery process with an identity provider.

Various embodiments of devices described herein may create tokens locally (e.g., by the local OP). For example, the local OP may know secrets to create the token signature. In an example embodiment, HMAC signatures may be used. For example, the local OP may have access to a list comprising client secrets for services. The list, for example, may be maintained, updated, and/or managed by the MNO (e.g., using OTA channels).

According to another implementation that uses HMAC signatures, a local OP may use an audience field and/or may query an MNO service endpoint (e.g., over a secure communication channel), for example, to get the corresponding secret from the network IdP. For example, querying the URL of the provider's JSON Web key document may get the identifier of the key. A local OP may make a secured and/or authenticated request to get the key material. A request may occur, for example, at the time of authentication, such as by introducing communication steps and/or by a protocol run which may be independent from user authentication (e.g., loading of key material in times of low usage).

In another example embodiment, the secret may be derived from the shared secret S and/or the audience field contents. For example, the local OP may calculate the client key. A key derivation function may be used by the network IdP, for example, to calculate the client secret (e.g., based on the long-term secret S). The client secret may be shared with local OP instances. In a discovery process, for example, the network IdP may use the KEF to calculate the client secret. The local OP may calculate the same client secret.

A JSON Web Signature (JWS) may allow the use of header fields for signed JWT. For example, header fields may be used to convey information on the key, such as information that may have been used for the signature. The 'jku' parameter may point to a JSON Web Key (JWK) URL which may host public keys. The 'kid' key id parameter may indicate which key may have been used. In an alternative embodiment, the header may comprise the field 'x5u' which may point to an URL (e.g., for the X.509 public key certificate). The OP in the network may create keys and/or certificates for local OP instance(s) and/or may provide the URL for the services/clients, for example, to fetch the public key certificates. The local OP may comprise a private key and/or may comprise a pointer to the URL, such as a point to the URL for the corresponding public key certificate in the header of the JWS for example. In an example embodiment, the local OP may encode an ID token according to JWT, may apply the signature, and may send the ID token to the service provider.

A local OP may be equipped with a key pair. For example, a private key may be stored securely (e.g., in the local OP). The network OP may know the public key and optionally a corresponding certificate for the public key. The network OP may act as the Certificate Authority (CA) and may create the certificates itself or the network OP may get the public keys certified (e.g., from a third party CA). In an example embodiment in which a local OP is equipped with a key pair, a user may want to visit a service provider (e.g., for the first time) and may enter an email address. The service provider may extract the username and/or OP host and/or may perform discovery and/or registration steps. For example, the service provider (e.g., website) may not have been previously viewed by the user and/or the OP. The service provider (client) may register with the network OP, and the network OP may provide the JWK URL comprising a list of certified public keys. The service provider may redirect the user agent (e.g., browser) to the authorization server, for example, with a request for an ID token and/or an access token for attributes(s).

The internal routing of the device may be such that the user agent may be directed to the local OP instance. The local OP may authenticate the user locally. In an example embodiment, the local OP may extract the requested attributes (e.g., claims) and/or may check the availability of user attributes. The attributes that are requested may or may not be available in the network. For example, the local OP may get user consent (e.g., authorization) to create an access token. Authorization may give the service provider access to at least a portion of the requested attributes. The user may have previously given consent to release data (e.g., by clicking an 'always ok to release' checkbox). Such a consent may be stored, for example, for future decisions. The local OP may create an ID token and may sign the token, such as by using the private key for example. The URL of the certificate may be put in the x5u field of the JWS header of the token. The local OP may create an access token and may apply a signature to it. The access token may be treated as an opaque value by the service provider and may not comprise data. The access token may be redeemed (e.g., at the user info endpoint in the network or in the device). The consent may be encoded in the token. The type of encoding of the consent decision in the access token may be implementation dependent. The local OP may redirect the user agent with the ID token and the access token, for example, to the client endpoint. The URL to redirect the user agent may be provided by the service provider in the initial request (e.g., parameter redirect uri). The service provider may want to verify the ID Token signature itself. For example, the service provider may request the public key and/or certificate from the URL such as the URL provided in the x5u parameter in the header of the token for example. In an example embodiment, the service provider may contact the check ID endpoint of the OP with the ID Token (e.g., for a token verification request). This communication may be protected by the use of the client secret, for example, which may be shared between the service provider and the OP. The check ID endpoint may verify that the token was issued by an authorized local OP instance, for example, by checking the signature from the token header such as by using the public key as provided in the x5u parameter of the header. The check ID endpoint may return the result of the token verification to the service provider.

As a result of an ID token verification, the service provider may know the user identifier and/or the issuer of the identifier. For example, if the service provider did not request an access token (e.g., the service provider does not need additional data to provide access to the requested service), the authentication protocol may end and the service provider may provide the requested data/service to the user. If an access token has been requested by the service provider and the access token issued to the service provider, the service provider may use the access token in a request to the user info endpoint, for example, to retrieve the user information (e.g., attributes). The access token may comprise user attributes according to an example embodiment. The local OP may retrieve attributes, may create the token, and/or may sign the token. According to an example embodiment, the service provider may autonomously verify the token validity and may retrieve the desired information (e.g., user attributes or claims).

The user info endpoint may verify that the token was issued by a valid and authorized local OP. The endpoint may verify that the user consented to the release of the requested data. Verification of the validity of the local OP may be completed by verifying the JWS signature on the access token. Verification of user consent may modify an internal structure of the access token, for example, to carry information associated with user consent. Upon verification, the user info endpoint may return the requested attributes to the service provider (e.g., in JSON format). The service provider may create a local copy of a user profile of the user (e.g., using the received attributes) and/or may provide access to a service. According to an example embodiment, if the user visits the service provider again, the registration and/or discovery steps may not be performed by the service provider. The user may be directed to perform authentication and authorization, and the user may directly log in to the service provider after token verification.

In an example embodiment, the private keys may exist in a secure environment. The local OP may create the key pair locally in a secure trusted environment (e.g., a security module, a trusted module, or the like) and may store the private key in the secure element. The network OP may create a certificate for the corresponding public key and/or may provide the certificate (e.g., on request) to service providers. As described herein, the notation K may denote a key pair, pu(K) may denote a public key, pr(K) may denote a private key, and cert(K,C) may denote a certificate for pu(K). For example, a cert(K,C) may be issued by the holder of key C and/or it may be created using the key pr(C) and/or it may be verified using pu(C).

Upon installation of a local OP applet on a secure element, for example, the applet may generate a root key pair R, may store pr(R) in the secure element, and may get a certificate cert(R,I) from the secure element issuer or manufacturer (e.g., from a smart card manufacturer). The certificate may be stored by the issuer and may be stored in the secure element.

According to an example embodiment, the local OP may be enrolled in the domain of an OP Server Function (OPSF). This enrollment may be triggered, for example, when the local OP application on a mobile device is installed or first started. The OPSF may provide an enrollment endpoint that may be used by local OPs, for example, to enroll new keypairs with the OPSF.

The local OP may generate an OpenID application specific key pair $O_1$, may create a cert($O_1$,R) (e.g., may sign pu($O_1$) using pr(R)) and may submit cert($O_1$,R) and cert(R,I) to an enrollment endpoint of the OPSF). The enrollment endpoint may check the cert(R,I), for example, to verify that the local OP has been created and issued by a trustworthy issuer. For example, the verification may comprise checking the certificate for the issuer key I and may comprise OCSP checks (e.g., which may determine if the certificates are valid). The OPSF enrollment endpoint may check the cert ($O_1$,R) to verify that the key pu($O_1$) has been created by that local OP instance.

The local OP may use the key to create token signatures. For example, the OPSF may make the certificate (e.g., chain) available to RPs (e.g., at the certificate endpoint). The OPSF may store the certificate and its certificate chain. The certificate(s) may be available at the certificate endpoint according to an example embodiment. Alternatively, the OPSF may create a certificate for $O_1$ which may be cert($O_1$, P). OPSF may make certificate cert($O_1$,P) available at the certificate endpoint. In the various embodiments, the OPSF may return the URL of the certificate at the certificate endpoint to the local OP (e.g., may be encrypted and/or signed). The OPSF may apply across certification, for example, and thus may integrate the OPSF domain PKI with the secure element issuer domain.

The local OP may include the URL (e.g., as received) for the certificate (e.g., cert($O_1$,R) and/or cert($O_1$,P) which may depend on the method used) in the token headers as described herein. For example, the local OP may use the pr($O_1$) key to create the token signature.

The local OP may need to update the signing key $O_1$ and/or the certificate. For example, the validity of the certificate may be checked when the key may be used. A renewal process may be triggered when an expiration date approaches.

The signing key $O_1$ may be replaced with a newly generated key pair $O_2$. For example, a new pubic verification key may be enrolled with the OPSF domain. An old verification key may stay available (e.g., at its old URL for a transition period). In an example embodiment, clients may use the key for token signature verification. The OPSF may know the validity period of the latest issued ID token, and the old certificate (e.g., cert($O_1$,R) or cert($O_1$,P)) may be available for the validity period. If the validity period is not known, for example, the entities may agree on a minimum duration for the transition period in which the old certificates remain available. The OPSF may generate the certificates, it may create the previous cert($O_1$,P), and it may create the cert($O_2$,P). A new key pair $O_2$ may be enrolled using the old key pair $O_1$ (e.g., a cert($O_2$, $O_1$) may be used in the enrollment) and a chain of keys (e.g., key history) may be built. The old/previous/expired signature key may be deleted.

In another example embodiment of enrollment, the local OP may generate the key pair dynamically, for example, in the protocol flow. For example, the local OP and OPSF may share a long term secret ($K_L$). A key pair may be created and/or based on a random seed value and/or the long term shared secret that may be known to the OPSF. The random seed may be passed to the OPSF and the OPSF may re-calculate the keys. The private key may be available in the local OP and in the network.

As described herein, the local OP may receive the token request message and may generate the token signatures. The local OP may generate a random seed value S, for example, when token signatures are generated. The local OP may calculate a new key pair, for example, based on S and the long term secret $K_L$. The public key that may be used to sign the token and the x5t URL parameter of the token header may set to a dynamic URL (e.g., at the OPSF's certificate endpoint). The dynamic URL may comprise the seed S as a parameter (e.g., http://opsf.org/cert.php?seed=1234). The certificate endpoint may, based on the received parameter S and/or the long term secret $K_L$ for example, calculate the key pair that the local OP calculated. The certificate endpoint may generate a certificate for the public key. The OSPF may delete the private key and/or may provide the public key certificate at the dynamic URL (e.g., http://opsf.org/cert-.php?seed=1234). If a client receives the token and queries the URL (e.g., http://opsf.org/cert.php?seed=1234), the OPSF may generate the correct key pair and may provide the certificate to the client. If the key and/or certificate have already been created, for example, the OPSF may directly provide the certificate to the client.

Figure 9:
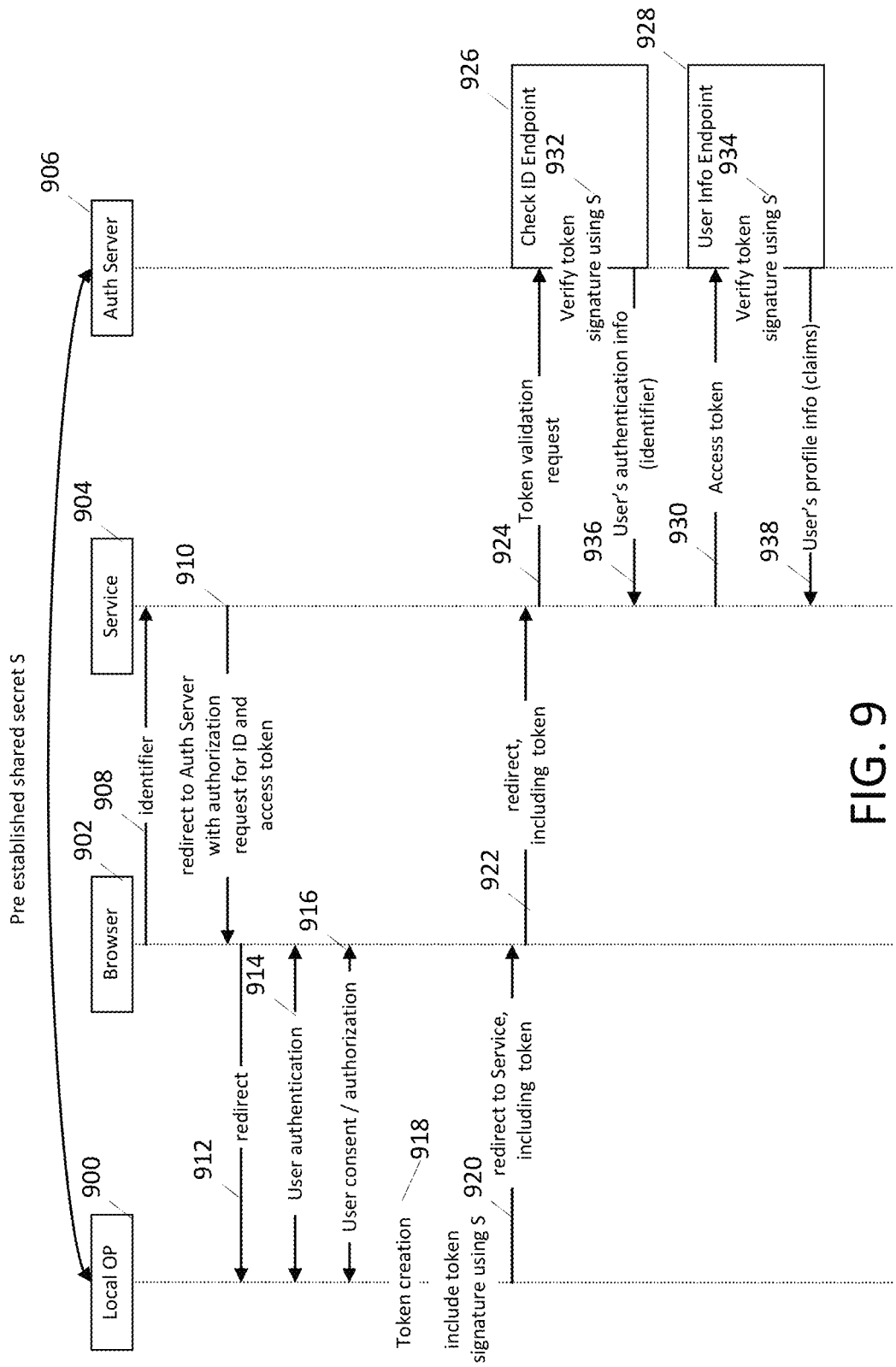
FIG. 9 shows a flow diagram of an example protocol flow with a local OP that shares a pre-established shared secret S according to an example embodiment.

FIG. 9 shows a flow diagram of an example protocol flow with a local OP 900 that shares a pre-established shared secret S with an authentication (auth) server 906. In an example scenario, a local OP may not be equipped with private keys that may be used to create asymmetric signatures on the ID Token. For example, HMAC signatures may be used for the token signatures. In alternative example scenario, a key that is established between a network OP, such as the authentication server 906, and the client (e.g., service provider 904) may be used for the creation of token signatures, for example, so that the clients may autonomously validate the signatures.

Referring to FIG. 9, at 908, a user may request access to a service that is provided by the service provider 904 via the browser 902 of a UE. At 908, the browser 902 may provide an identifier, such as an OpenID identifier for example, to the service provider 904. The service provider 904 may prepare an authorization request that may comprise a request for an ID token and an access token, and the service provider 904 may send the request, via a redirect message at 910, to the browser 902. The request at 910 may include request for an ID token in accordance with an OpenID Connect protocol. The request at 910 may include a request for an access token in accordance with an OpenID Connect protocol. For example, an access token may be requested by the service provider 904 so that the service provider 904 can retrieve attributes of the user a UE. At 912, the request may be forwarded, via the redirect message, from the browser 902 on a UE to a trusted module on the UE, such as a local OP 900 for example. At 914, a user of the UE may be authenticated by the local OP 900. At 916, a user may give consent (approval) for the UE to issue a token to the service provider 904. For example, the authorization request may be approved by a user of the UE. Further, in response to the authorization request, at the UE, the access token may be created that is associated with the user approval of the authorization request. In an example embodiment, user approval of the authorization request may be received automatically via a policy that is stored on the UE.

Still referring to FIG. 9, at 918, tokens may be created at the local OP 900. Information may be added to the token. For example, an extension to a token may add information to the JSON data structure of the token. In an example embodiment, a token may comprise:

```
{
"iss": (e.g., http://server.example.com),
"user_id": (e.g., 248289761001),
"aud": (e.g., http://client.example.com"),
"exp": (e.g., 1311281970),
"lop_id": (e.g., may represent an identifier for the local OP such as
   11223344556677),
"timestamp": (e.g., may represent a time timestamp with a format
   YYYYMMDDhhmmss[.s...]Z' such as time20111012143815Z), and/or
"lop_sig": (e.g., may represent a signature using HMAC
   SHA1({lop_id|timestamp}) such as
   572400e4ec56fdce9549777bf67d70041f53a6aa)
}
```

For example, at 918, an HMAC_SHA1 signature may be calculated using the shared secret S as the key. The signature may be calculated on the concatenation of the local OP ID and/or the timestamp of user authentication. In another example token, the data may be structured in accordance with JSON, for example, by creating a group of the local OP fields as illustrated below:

```
{
"iss": (e.g., http://server.example.com),
"user_id": (e.g., 248289761001),
"aud": (e.g., http://client.example.com),
"exp": (e.g., 1311281970),
"local_openid": {
   "lop_id": "(e.g., may be an identifier for the local OP such as
      11223344556677),
   "timestamp": "(e.g., 20111012143815Z), and/or
      "lop_sig": (e.g., may be a signature using HMAC
      SHA1({lop_id|timestamp}) such as
      572400e4ec56fdce9549777bf67d70041f53a6aa)
   }
}
```

As described, content may be added to an ID Token and a valid HMAC SHA™ signature may be created. For example, the key that may be used for the signature may be the client secret. Information may be added to a JSON token and/or its internal structure may be modified. In accordance with an example embodiment, a service provider may ignore additional fields in a token and/or a service provider may treat the token as opaque values.

As described herein, the key that may create token signatures may be the client secret. For example, a client secret may be established between the client (service provider) and the authentication server (OPSF), for example, in a registration process. The authentication server may provide a list of client secrets to the local OP, for example, to enable the local OP to create the correct token signature. For example, the authentication server may use over-the-air management methods to install a list of client secrets in local OP instances. When a new client secret is registered (e.g., for a new client and/or an existing client), the list in a local OP may be updated. For example, the audience (aud) parameter, which may be the URL of the client, in the token request may identify the client that is requesting the tokens. The audience parameter may be used by the local OP, for example, to find the corresponding client secret in the local OP storage.

In another example embodiment, client secrets may be queried from an authentication server. For example, a local OP may get to know the client secrets to create valid HMAC signatures for tokens. In order for the local OP to know the client secrets, the authentication server may provide the client secret to the local OP upon request. In such a provision, the local OP may extract the client name from the audience parameter that may be received in the token request. The local OP may establish an authenticated and/or secured connection to the authentication server, for example, at a specific endpoint. The local OP may request the client secret for the client. The client secret may be used to create the signature. For example, the authentication server may provide a client secret endpoint https://op.org/clients.php. Such a client secret endpoint may use TLS encryption and/or may be authenticated. In an exemplary protocol run according to an embodiment, before creating the token signatures, the local OP may connect to a client secret endpoint, may authenticate to the client secret endpoint, and may request a resource such as https://op.org/clients.php?client_audience=audience for example. In the example resource, the audience may equal the content from the received audience field. The client secret endpoint may return the client secret to the local OP. Then the local OP may use the secret to create a valid signature.

In yet another example embodiment, client secrets may be derived from long term secrets in an authentication server and a local OP. For example, client secrets may be established in a registration process, for example, between a client and a network OP. According to embodiments described herein, the local OP and the network IdP/OP (authentication server) may share a long term secret. Various methods for creating a long term shared secret are described herein. For example, a long term shared secret may be embedded in the local OP application (e.g., at installation). A long term shared secret may be generated via OTA management operations of the MNO. A long term shared secret may be created by key derivation, for example, from a network authentication protocol run. A shared secret may act as a trust anchor between a network IdP/OP (authentication server) and a device/local OP. The secret may be protected in the local OP, for example, by the secure element's security features such as a SIM card and/or an embedded security element for example.

In an exemplary registration process of a client, the authentication server may use the long term secret with the audience parameter from the client in a key derivation function (KDF). For example, a network OP may derive the client secret, such that a client secret=KDF (audience, long term secret). In an exemplary authentication protocol run, the local OP may read the audience field from the token request header and may apply the same KDF to the audience field and the long term secret to calculate the client secret. The client secret may then be used to create the token signature.

Referring again to FIG. 9, at 910, an authorization request may be integrated into a token, such as an access token for example. An original authorization request from a client (e.g., service provider 904) may be integrated into a token, for example, to ensure that an issued access token may be redeemed for the requested resources. In an example scenario, a local OP 900 may authorize access to data in a local token creation process, and the data may be provided by the network or locally by the local OP 900. In the example scenario, the request may be changed, for example, when using the token toward the network. The token may comprise information on the authorization request to the network. For example, an authorization request may be sent from the service provider to an Authorization Server/OP 906 via a redirect message. When a local OP 900 is used as described herein, the authorization request may be sent to the local OP 900 via the redirect, at 910 and 912. A service provider 904 may use OpenID Connect scopes to specify access privileges are requested in an authorization request for access tokens. For example, the scopes associated with access tokens may determine resources that may be available when they are used to access OAuth 2 protected endpoints, for example.

Exemplary scopes include an OpenID scope that may inform the Authorization Server that the client may be making an OpenID request. In an example configuration, if the OpenID scope is not specified, the Authorization Server may treat the request as a generic OAuth 2.0 request and may not perform OpenID processing. A profile scope, for example, may request default profile information. An email scope may request an email address. An address scope may request an address.

In addition to the scope parameter, the authorization request may comprise an OpenID request object which may allow a client (e.g., service provider 904) to build request structures. For example, an OpenID request object may be passed as an encoded JWT and/or as an URL that may point to an OpenID request object.

Below is an example of an OpenID request object, before JWT encoding, which may be implemented in an OpenID Connect protocol:

```
{
"response_type": "code id_token",
"client_id": "s6BhdRkqt3",
"redirect_uri": "https://client.example.com/cb",
"scope": "openid profile",
"state": "af0ifjsldkj",
"userinfo":
 {
  "claims":
   {
    "name": null,
    "nickname": {"optional": true},
    "email": null,
    "verified": null,
    "picture": {"optional": true},
   },
   "format": "signed"
 }
"id_token":
 {
  "max_age": 86400,
  "iso29115": "2"
 }
}
```

Below is an example of an encoded JWT that may be implemented in an OpenID Connect protocol:

```
JWT algorithm = HS256
HMAC HASH Key = 'aaa' (e.g., this may be the id of the key
 to sign the JWT)
JSON Encoded Header = "{"alg":"HS256","typ":"JWT"}"
JSON Encoded Payload = "{"response_type":"code id_token",
 "client_id":"s6BhdRkqt3",
 "redirect_uri":"https://client.example.com/cb",
 "scope":"openid profile",
 "state":"af0ifjsldkj",
   "userinfo":{"claims":{"name":null,"nickname":{"optional":true},
    "email":null,"verified":null,
     "picture":{"optional":true}},"format":"signed"},
 "id_token":{"max_age":86400,"iso29115":"2"}}"
```

```
JWT =
eyJ0eXAiOiJKV1QiLCJhbGciOiJIUzI1NiJ9.eyJyZXNwb25zZV90eXBlIj
oiY29kZSBpZF90b2tlbiIsImNsaWVudF9pZCI6InM2QmhkUmtxdDMiL
CJyZWRpcmVjdF91cmkiOiJodHRwczpcL1wvY2xpZW50LmV4YW1w
bGUuY29tXC9jYiIsInNjb3BlIjoib3BlbmlkIHByb2ZpbGUiLCJzdGF0ZS
I6ImFmMGlmanNsZGtqIiwidXNlcmluZm8iOnsiY2xhaW1zIjp7Im5hbW
UiOm51bGwsIm5pY2tuYW11Ijp7Im9wdGlvbmFsIjp0cnVlfSwiZW1ha
WwiOm51bGwsInZlcmlmaWVkIjpudWxsLCJwaWN0dXJlIjp7Im9wdG
lvbmFsIjp0cnVlfX0sImZvcm1hdCI6InNpZ25lZCJ9LCJpZF90b2tlbiI6ey
JtYXhfYWdlIjo4NjQwMCwiaXNvMjkxMTUiOiIyIn19.2OiqRgrbrHkA1
FZ5p__7bc__RSdTbH-wo__Agk-ZRpD3wY
```

Below is an example of an authorization request that may be implemented in accordance with an OpenID Connect protocol:

```
https://server.example.com/authorize?
response_type=code%02id_token
&client_id=s6BhdRkqt3
&redirect_uri=https%3A%2F%2Fclient%2Eexample%
 2Ecom%2Fcb
&scope=openid
&state=af0ifjsldkj
&request=eyJ0eXAiOiJKV1QiLCJhbGciOiJIUzI1NiJ9.eyJyZXNw
b25zZV90eXBlIjoiY29kZSBpZF90b2tlbiIsImNsaWVudF9pZCI6InM2
QmhkUmtxdDMiLCJyZWRpcmVjdF91cmkiOiJodHRwczpcL1wvY2x
pZW50LmV4YW1wbGUuY29tXC9jYiIsInNjb3BlIjoib3BlbmlkIHByb2Z
pbGUiLCJzdGF0ZSI6ImFmMGlmanNsZGtqIiwidXNlcmluZm8iOnsiY
2xhaW1zIjp7Im5hbWUiOm51bGwsIm5pY2tuYW11Ijp7Im9wdGlvbmF
sIjp0cnVlfSwiZW1haWwiOm51bGwsInZlcmlmaWVkIjpudWxsLCJwa
WN0dXJlIjp7Im9wdGlvbmFsIjp0cnVlfX0sImZvcm1hdCI6InNpZ25lZCJ
9LCJpZF90b2tlbiI6eyJtYXhfYWdlIjo4NjQwMCwiaXNvMjkxMTUiOiIy
In19.2OiqRgrbrHkA1FZ5p__7bc__RSdTbH-wo__Agk-ZRpD3wY
```

Referring again to FIG. 9, an authorization request, such as the authorization request illustrated herein for example, may be sent to the local OP via an HTTP redirection (e.g., see 910 and 912 in FIG. 9). The local OP 900 may check that the request is valid and/or may authenticate the user. The local OP 900 may create the token which may be issued to the service provider 904, via redirect messages at 920 and 922. The service provider 904 may use tokens, for example, to get data from the ID token endpoint 926 and/or the user info endpoint 928.

In an example embodiment, the requests 924 and 930 to the token endpoints 926 and 928, respectively, may not comprise the original request object. In such a request (e.g., requests 924 and 930), the token may be received by the token endpoints 926 and 928, for example, and there may be no indication of the information being requested by service provider 904 and the information being authorized to be accessed by the service provider 904. In such a request, the local OP 900 may convey the requested information to the token endpoints by adding the JWT encoded request to the token before it issues to the service provider 904. For example, the token may carry the request information, and the request information may be evaluated by the token endpoints. The request JWT, for example, may be signed by the local OP 900 to prevent an attack, such as an attack where the service may change the request after the user's authorization for example. The token signatures may be verified at the respective endpoints using the shared secret S, at 932 and 934. After an ID token signatures is verified, the user's authentication information (e.g., user identifier) may be provided to the service provider 904, at 936. After an access token signature is verified, the user's profile information, such as the user attributes or user claims which were requested by the service provider 904, may be provided to the service provider 904 at 938. An example of a token that comprises request information is provided below:

```
{
    "iss": "http://server.example.com",      //may be implemented in OpenID Connect
    "user_id": "248289761001",                //may be implemented in OpenID Connect
    "aud": "http://client.example.com",      //may be implemented in OpenID Connect
    "exp": 1311281970,                        //may be implemented in OpenID Connect
    "local_openid": {
        "lop_id": "11223344556677",           //may be an identifier used for a localOP
        "timestamp": "20111012143815Z",       //'YYYYMMDDhhmmss[.s...]Z'
        "request":
"eyJ0eXAiOiJKV1QiLCJhbGciOiJIUzI1NiJ9.eyJyZXNwb25zZV90eXBlIjoiY29kZSBpZF90b2tlbi
IsImNsa
WVudF9pZCI6InM2QmhkUmtxdDMiLCJyZWRpcmVjdF91cmkiOiJodHRwczpcL1wvY2xpZW50
LmV4YW1wbGUuY29t
XC9jYiIsInNjb3BlIjoib3BlbmlkIHByb2ZpbGUiLCJzdGF0ZSI6ImFmMGlmanNsZGtqIiwidXNlcm
luZm8iOns
iY2xhaW1zIjp7Im5hbWUiOm51bGwsIm5pY2tuYW1lIjp7Im9wdGlvbmFsIjp0cnVlfSwiZW1haW
wiOm51bGwsIn
ZlcmlmaWVkIjpudWxsLCJwaWN0dXJlIjp7Im9wdGlvbmFsIjp0cnVlfX0sImZvcm1hdCI6InNpZ2
5lZCJ9LCJpZ
F90b2tlbiI6eyJtYXhfYWdlIjo4NjQwMCwiaXNvMjkxMTUiOiIyIn19.2OiqRgrbrHkA1FZ5
p_7bc_RSdTbH-woAgk-ZRpD3wY",
        "lop_sig": "a0a52ecf404981d579dab41439b10e0cdfb48f91"
                //may be a signature using HMAC SHA1({lop_id|timestamp|request})
    }
}
```

Referring to the example token above, the signature lop_sig may be calculated over the concatenated lop_id, timestamp and request. The token may be signed by the local OP, for example, so that the signature may be verified by the service provider and/or an identity provider's token endpoint. According to an example embodiment, an auth code may comprise request information.

Figure 10:
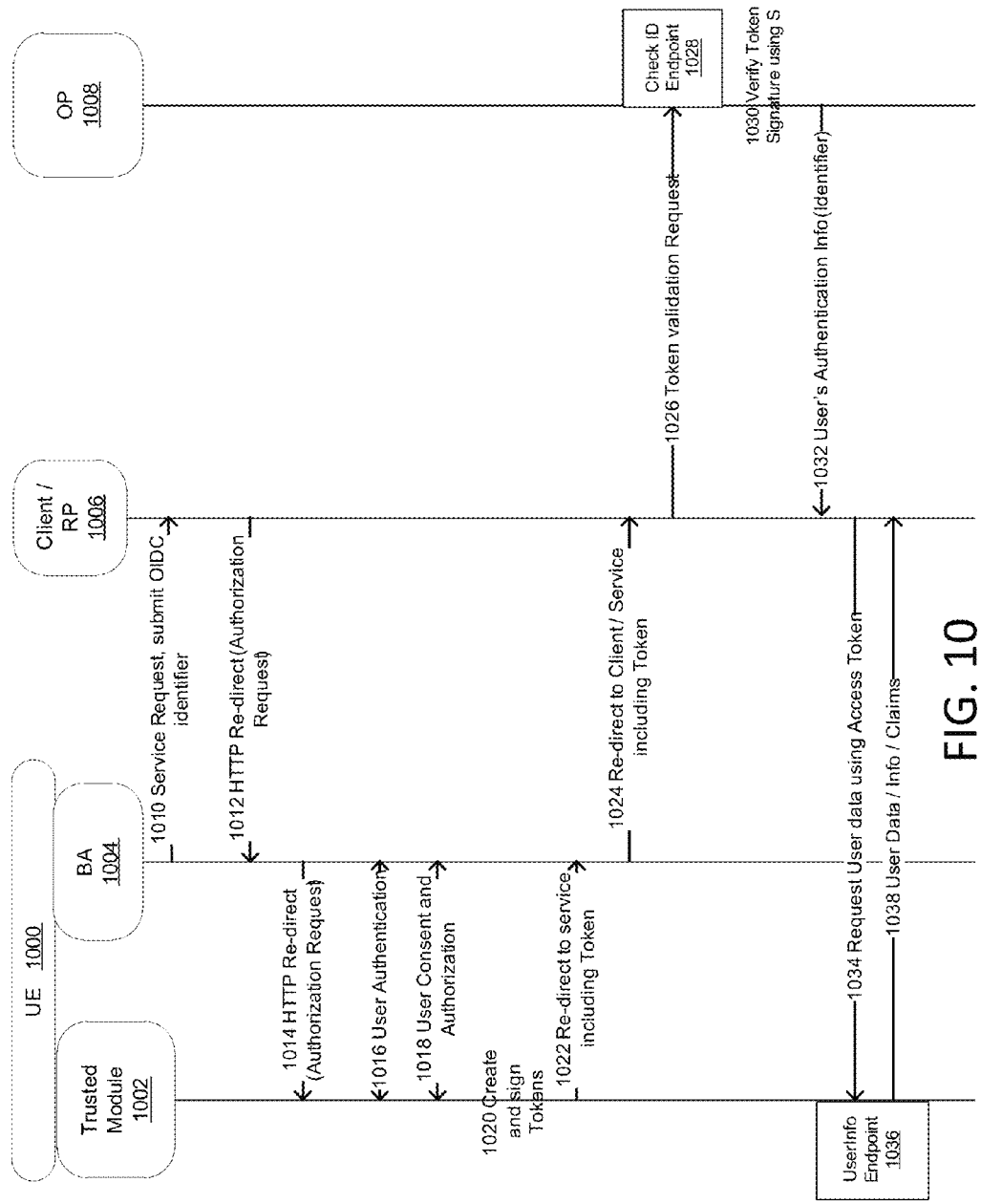
FIG. 10 is a call flow of an OpenID protocol in which the user information endpoint resides locally on a UE according to an example embodiment.

As described herein, user data (e.g., attributes) may be stored at a user info endpoint. Such a user info endpoint may reside on a network entity, a cloud, or the like, and the user data may be accessed from the network or cloud. FIG. 10 illustrates a call flow according to another example embodiment in which the user info endpoint resides locally on a UE. User data, such as confidential information, may be stored locally on the UE 1000, a UICC within the UE 1000, a trusted module 1002 that resides within the UE 1000, or the like. Mechanisms are provided that allow for the authorization and transport of the locally stored user data. The user info endpoint may be located on the trusted module 1002 in accordance with the illustrated embodiment.

In an example scenario, a user may want certain confidential information, such as his/her Social Security Number (SSN) for example, to be stored locally on the UE 1000. Such locally stored information may be stored on a secure/trusted hardware module 1002 or UICC, rather than in the network/cloud. A local policy, which may be controlled and configured by multiple stakeholders such as the OP/OPSF and User within the UE for example, may authorize the release of the confidential information stored in the UE 1000 to a service provider RP/client 1006.

For example, users may not be confident about the security and/or privacy of their confidential information that is stored on the network or cloud. Such information may include the social security numbers of users, for example. Users may choose to keep that information private by storing it on the UE. In an example configuration, users may store some user attributes (e.g., name, address, or the like) on the network while other user attributes (e.g., SSN, date of birth, or the like) are stored locally on a secure environment of the UE. In an example scenario in which a user wants to obtain the services of a financial institution, the institution may require the user's SSN in order for the user to access a service that is provided by the financial institution. Following a successful authentication that may be network based and/or local, for example, a policy on the UE may authorize the release of the locally stored SSN to that financial institution. In such an example scenario in which the SSN is locally stored, other user information, for example nonconfidential user attributes, may be obtained by the institution from the network/cloud.

Referring to FIG. 10, at 1010, the browser agent (BA) 1004 may send the user identifier to the SP/Client/RP 1006, and may request access to a service that is provided by the RP 1006. At 1012, the RP 1006 may build the authorization request and may redirect the BA 1004 to the trusted module 1002 with the authorization request (at 1014). At 1016, a user of the UE 1000 may be authenticated at the UE 1000. At 1018, the UE may determine that it has a user consent/authorization to issue at least one token to the RP 1006. At 1020, trusted module 1002 (e.g., a local OP) may generate tokens in accordance with an OpenID Connect protocol. The trusted module 1002 may sign the tokens at 1020. A token header may comprise an indicator for the OP 1008 to determine that the token that comprises the header was generated locally. At 1022, the trusted module 1002 may then pass the redirect message that comprises the signed tokens to the BA 1004, which may redirect the BA 1004 to the RP 1006, at 1024. One or more of the signed tokens may comprise access tokens that may be formatted in accordance with an OpenID Connect protocol. For example, access tokens may be generated locally on the UE 1000 via the trusted module 1002, at 1020, with or without the knowledge of a network entity such as the OP 1008, and may be sent to the SP/Client/RP 1006, at steps 1022 and 1024. An access token that is associated with specific user data or a class of user data may be bound to a location (e.g., URL) that corresponds to the location of a user info endpoint that is associated with the access token. In an example configuration, user data (e.g., attributes) may be classified as confidential or nonconfidential, and confidential data may be accessed from a user info endpoint that resides locally on the UE 1000, and nonconfidential data may be accessed at a user info endpoint that resides on the network.

With continuing reference to FIG. 10, at 1026, the RP 1006 may contact the check ID endpoint 1028 at the OP 1008 with a validate token request message that may comprise an ID token. At 1030, the check ID endpoint 1030 may verify the token signature S, as described herein. At 1032, the check ID endpoint 1028 may return the user's authentication information to the RP 1006. If an access token has been requested and issued, for example, then the client 1006 may request user data using the requested access token 1034. For example, an access token may carry information about the location of the user info endpoint 1036, such as the location of the trusted module 1002 that hosts the user info endpoint 1036. Alternatively, the location information of the user info endpoint may be transported as part of the redirect message at 1024, instead of being part of the access token for example. At 1034, the RP 1006 may request the user data from the user info endpoint 1036 that may reside locally on the UE 1000, for example, by using an access token as described herein. At 1038, the user info endpoint 1036 that may reside on the trusted module 1002 may return the requested user data (e.g., social security number, address, etc.). In an example embodiment, the UE 1000 may receive full access to a service provided by the client 1006 after user data is received by the RP 1006.

In another example embodiment described herein, access tokens may be generated in the network/cloud. For example, a network entity may generate an access token instead of the UE, and the tokens may be sent to the SP/Client/RP. The access tokens may carry information about the location (e.g., URL) of the user info endpoint, and the location may correspond to an entity in the network cloud or a user Info endpoint on the UE or within a trusted module within the UE. The user info endpoint location information may be carried within the message body of the access token.

Information that is accessible with the token(s) may reside on the UE, possibly without the knowledge of an identity provider or network/cloud entity, according to an example embodiment. Alternatively, the information that is accessible with respective tokens may reside on the network/cloud. Information in the tokens may be signed and/or encrypted to protect the token data from eavesdropping. Such information may be decrypted to obtain the token information. Such measures may ensure that only the rightful SP/Client/RP that has the correct key is able to obtain the token. Once the token is decrypted by the SP/Client/RP, the SP/client/RP may present the token to the user info endpoint. The UE or the trusted module on the UE and/or the network/cloud entity may generate and/or verify tokens and provide the requested data to the SP/Client/RP. The information elements may be distributed between the network and UE or common and synced between the network and UE.

Figure 11:
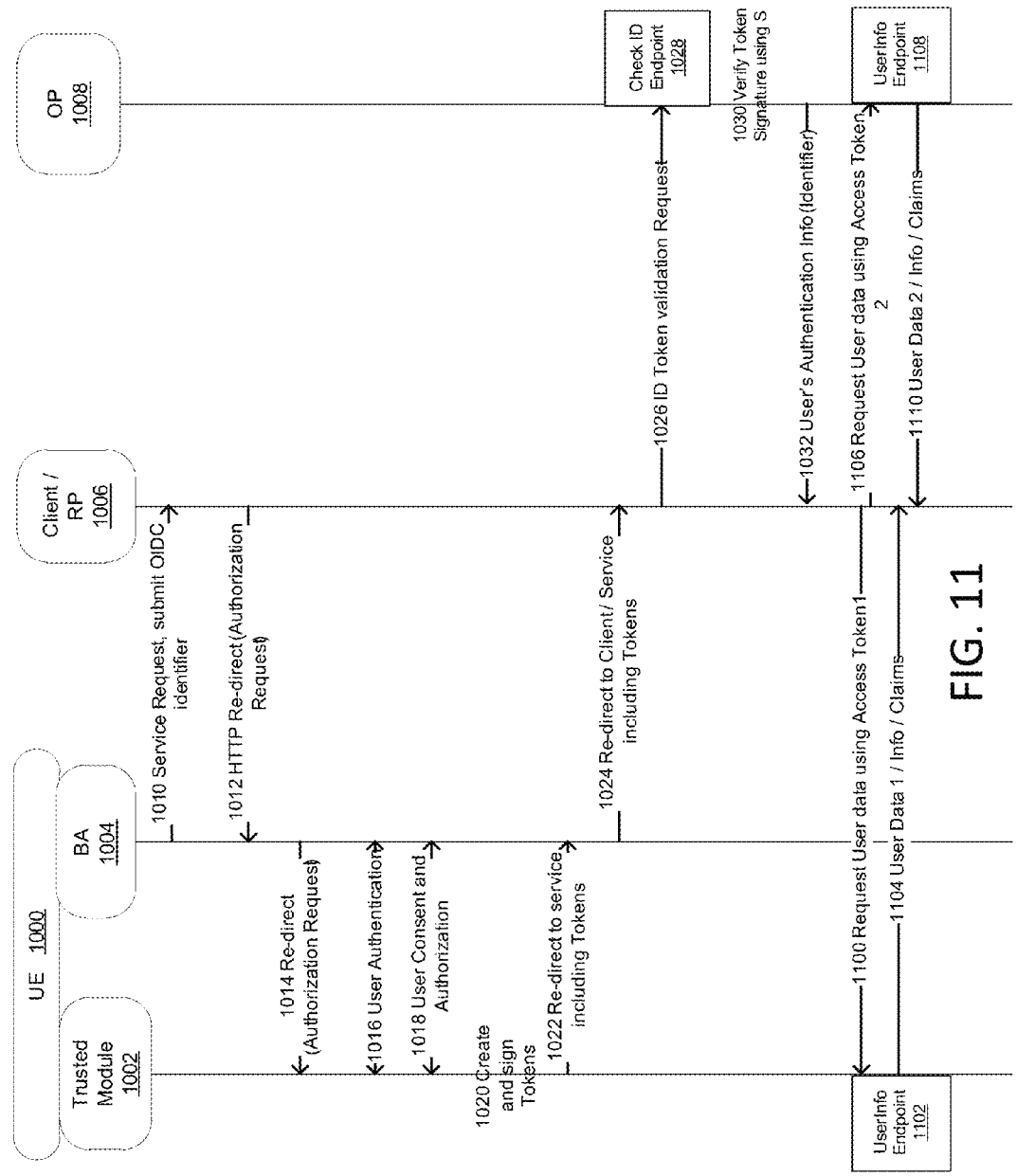
FIG. 11 is a call flow of an OpenID protocol in which user data is stored locally and user data is stored on a network entity according to an example embodiment.

For example, user data may be stored locally on a UE (e.g., on a UICC, trusted module, or the like), user data may be stored on a network entity (e.g., on a OP or the like), and user data may be stored in any appropriate combination thereof. FIG. 11 shows a call flow in which some user data is stored locally and some user data is stored on a network entity according to an example embodiment. Referring to FIG. 11, the step numbers that are also in FIG. 10 are described above with respect to FIG. 10. In an example configuration, user data that qualifies as confidential data may be stored locally and user data that qualifies as non-confidential data may be stored on a network/cloud entity. In an alternative configuration, the data is not classified, but may be stored locally, data may be stored on a network entity, or data may be stored on a combination thereof.

Upon a successful user authentication and verification of the identity token, the RP 1006 may request user data (e.g., user attributes) at 1100 and 1106. For example, at 1100, the RP 1006 may use a first access token to retrieve user data from the user info endpoint 1102 that resides within the UE 1000 at the trusted module 1002. Such user data may have been classified as confidential data. The first access token may comprise the location information of the user info endpoint 1102. At 1104, confidential user data, for example, may be provided to the RP 1006. At 1106, the RP 1006 may use a second access token to retrieve user data from the user info endpoint 1108 that on a network entity, such as the OP 1008 for example. Such user data may have been classified as nonconfidential data. The second access token may comprise the location information (e.g., URL) of the user info endpoint 1108 in order for the RP 1006 to redeem the user data from the user info endpoint 1108. The first access token that is associated with the confidential data and is used to obtain data from storage within the UE 1000 may be provided by a local OP (e.g., trusted module 1002 of the UE 1000). The location (e.g., URL) of user info endpoint 1102 may also be provided by a local OP of the UE 1000. In an example embodiment, after data, such as confidential and nonconfidential data for example, is obtained by the RP 1006, it may be combined at the RP 1006 and used for providing the UE 1000 access to services that are provided by the RP 1006. The data may be combined and consumed at the RP 1006.

Thus, as described herein, each access token or each class of user data (e.g., confidential, non-confidential, sensitive, general, or the like) may be associated with a location of user data. The location of the user data may correspond to a location of a UE or trusted modules such as UICC (e.g., a URL to the UE/UICC), a location in the network/cloud (e.g., URL to an entity within the network/cloud), or a combination thereof. Thus, user attributes that are stored in various locations may be requested, processed, combined, and consumed by a SP/Client/RP.

By way of example, the UE 1000 may receive an authorization request to create an access token for a service provider, such as the RP 1006. Based on the authorization request, at the UE, first access token may be created and a second access token may be created. The access tokens may associated with the service that is provided by the RP 1006 and the user of the UE 1000. The first access token may comprise information that is indicative of a location of a first user information endpoint that provides a first requested user attribute to the RP 1006 upon a verification of the first access token. The second access token may comprise information that is indicative of a location of a second user information endpoint that provides a second requested user attribute to the RP 1006 upon a verification of the second access token. The first user information endpoint may be located on the UE 100 and the second user information endpoint may located on a network entity, such as the OP 1008 for example, that communicates with the RP 1006 via the network.

Figure 12A:
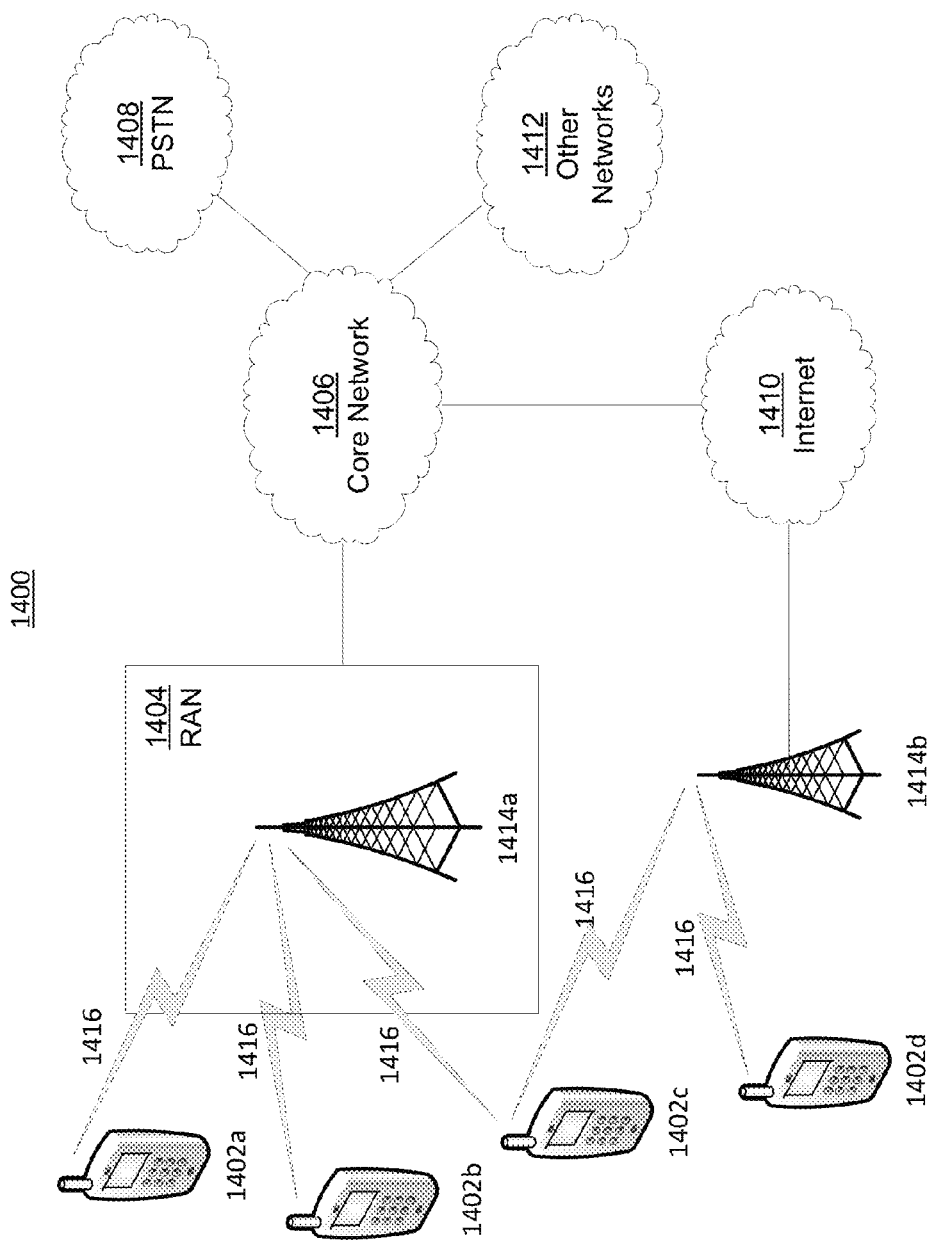
FIG. 12A is a system diagram of an example communications system in which one or more disclosed embodiments may be implemented.

FIG. 12A is a diagram of an example communications system 1400 in which one or more disclosed embodiments may be implemented. The communications system 1400 may be a multiple access system that provides content, such as voice, data, video, messaging, broadcast, etc., to multiple wireless users. The communications system 1400 may enable multiple wireless users to access such content through the sharing of system resources, including wireless bandwidth. For example, the communications systems 1400 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 12A, the communications system 1400 may include wireless transmit/receive units (WTRUs) 1402a, 1402b, 1402c, 102d, a radio access network (RAN) 1404, a core network 1406, a public switched telephone network (PSTN) 1408, the Internet 1410, and other networks 1412, though it will be appreciated that the disclosed embodiments contemplate any number of WTRUs, base stations, networks, and/or network elements. Each of the WTRUs 1402a, 1402b, 1402c, 1402d may be any type of device configured to operate and/or communicate in a wireless environment. By way of example, the WTRUs 1402a, 1402b, 1402c, 1402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1400 may also include a base station 1414a and a base station 1414b. Each of the base stations 1414a, 1414b may be any type of device configured to wirelessly interface with at least one of the WTRUs 1402a, 1402b, 1402c, 1402d to facilitate access to one or more communication networks, such as the core network 1406, the Internet 1410, and/or the networks 1412. By way of example, the base stations 1414a, 1414b may be a base transceiver station (BTS), a Node-B, an eNode B, a Home Node B, a Home eNode B, a site controller, an access point (AP), a wireless router, and the like. While the base stations 1414a, 1414b are each depicted as a single element, it will be appreciated that the base stations 1414a, 1414b may include any number of interconnected base stations and/or network elements.

The base station 1414a may be part of the RAN 1404, which may also include other base stations and/or network elements (not shown), such as a base station controller (BSC), a radio network controller (RNC), relay nodes, etc. The base station 1414a and/or the base station 1414b may be configured to transmit and/or receive wireless signals within a particular geographic region, which may be referred to as a cell (not shown). The cell may further be divided into cell sectors. For example, the cell associated with the base station 1414a may be divided into three sectors. Thus, in an embodiment, the base station 1414a may include three transceivers, i.e., one for each sector of the cell. In an embodiment, the base station 1414a may employ multiple-input multiple output (MIMO) technology and, therefore, may utilize multiple transceivers for each sector of the cell.

The base stations 1414a, 1414b may communicate with one or more of the WTRUs 1402a, 1402b, 1402c, 1402d over an air interface 1416, which may be any suitable wireless communication link (e.g., radio frequency (RF), microwave, infrared (IR), ultraviolet (UV), visible light, etc.). The air interface 1416 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 1414a in the RAN 1404 and the WTRUs 1402a, 1402b, 1402c may implement a radio technology such as Universal Mobile Telecommunications System (UMTS) Terrestrial Radio Access (UTRA), which may establish the air interface 1416 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 1414a and the WTRUs 1402a, 1402b, 1402c may implement a radio technology such as Evolved UMTS Terrestrial Radio Access (E-UTRA), which may establish the air interface 1416 using Long Term Evolution (LTE) and/or LTE-Advanced (LTE-A).

In other embodiments, the base station 1414a and the WTRUs 1402a, 1402b, 1402c may implement radio technologies such as IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1414b in FIG. 12A may be a wireless router, Home Node B, Home eNode B, femto cell base station, or access point, for example, and may utilize any suitable RAT for facilitating wireless connectivity in a localized area, such as a place of business, a home, a vehicle, a campus, and the like. In an embodiment, the base station 1414b and the WTRUs 1402c, 1402d may implement a radio technology such as IEEE 802.11 to establish a wireless local area network (WLAN). In an embodiment, the base station 1414b and the WTRUs 1402c, 1402d may implement a radio technology such as IEEE 802.15 to establish a wireless personal area network (WPAN). In yet an embodiment, the base station 1414b and the WTRUs 1402c, 1402d may utilize a cellular-based RAT (e.g., WCDMA, CDMA2000, GSM, LTE, LTE-A, etc.) to establish a picocell or femtocell. As shown in FIG. 12A, the base station 1414b may have a direct connection to the Internet 1410. Thus, the base station 1414b may not be required to access the Internet 1410 via the core network 1406.

The RAN 1404 may be in communication with the core network 1406, which may be any type of network configured to provide voice, data, applications, and/or voice over internet protocol (VoIP) services to one or more of the WTRUs 1402a, 1402b, 1402c, 1402d. For example, the core network 1406 may provide call control, billing services, mobile location-based services, pre-paid calling, Internet connectivity, video distribution, etc., and/or perform high-level security functions, such as user authentication. Although not shown in FIG. 12A, it will be appreciated that the RAN 1404 and/or the core network 1406 may be in direct or indirect communication with other RANs that employ the same RAT as the RAN 1404 or a different RAT. For example, in addition to being connected to the RAN 1404, which may be utilizing an E-UTRA radio technology, the core network 1406 may also be in communication with another RAN (not shown) employing a GSM radio technology.

The core network 1406 may also serve as a gateway for the WTRUs 1402a, 1402b, 1402c, 1402d to access the PSTN 1408, the Internet 1410, and/or other networks 1412. The PSTN 1408 may include circuit-switched telephone networks that provide plain old telephone service (POTS). The Internet 1410 may include a global system of interconnected computer networks and devices that use common communication protocols, such as the transmission control protocol (TCP), user datagram protocol (UDP) and the internet protocol (IP) in the TCP/IP internet protocol suite. The networks 1412 may include wired or wireless communications networks owned and/or operated by other service providers. For example, the networks 1412 may include another core network connected to one or more RANs, which may employ the same RAT as the RAN 1404 or a different RAT.

Some or all of the WTRUs 1402a, 1402b, 1402c, 1402d in the communications system 100 may include multi-mode capabilities, i.e., the WTRUs 1402a, 1402b, 1402c, 1402d may include multiple transceivers for communicating with different wireless networks over different wireless links. For example, the WTRU 1402c shown in FIG. 12A may be configured to communicate with the base station 1414a, which may employ a cellular-based radio technology, and with the base station 1414b, which may employ an IEEE 802 radio technology.

Figure 12B:
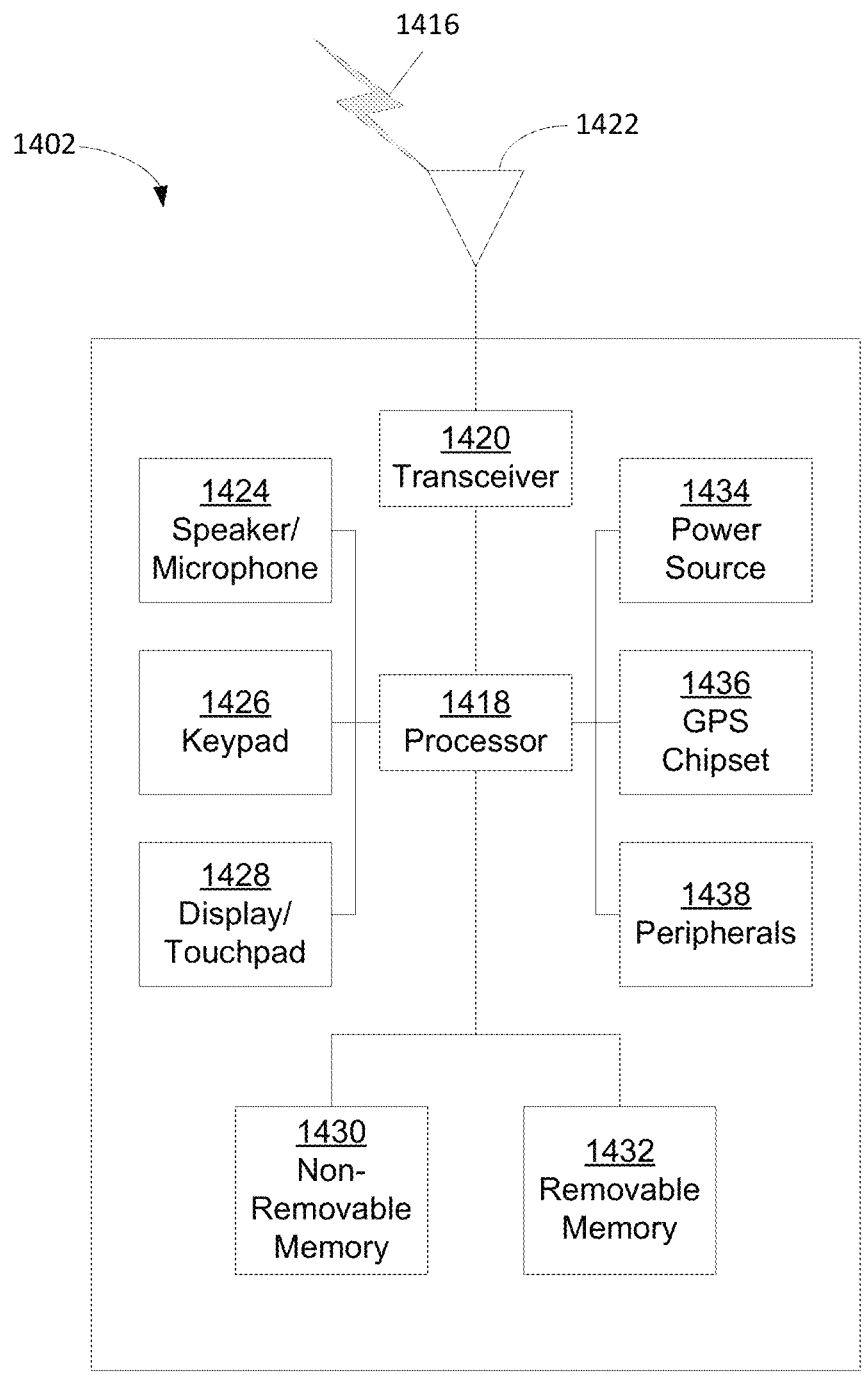
FIG. 12B is a system diagram of an example wireless transmit/receive unit (WTRU) that may be used within the communications system illustrated in FIG. 12A.

FIG. 12B is a system diagram of an example WTRU 1402. As shown in FIG. 12B, the WTRU 1402 may include a processor 1418, a transceiver 1420, a transmit/receive element 1422, a speaker/microphone 1424, a keypad 1426, a display/touchpad 1428, non-removable memory 1430, removable memory 1432, a power source 1434, a global positioning system (GPS) chipset 1436, and other peripherals 1438. It will be appreciated that the WTRU 1402 may include any sub-combination of the foregoing elements while remaining consistent with an embodiment.

The processor 1418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1418 may perform signal coding, data processing, power control, input/output processing, and/or any other functionality that enables the WTRU 1402 to operate in a wireless environment. The processor 1418 may be coupled to the transceiver 1420, which may be coupled to the transmit/receive element 1422. While FIG. 12B depicts the processor 1418 and the transceiver 1420 as separate components, it will be appreciated that the processor 1418 and the transceiver 1420 may be integrated together in an electronic package or chip. The processor 1418 may perform application-layer programs (e.g., browsers) and/or radio access-layer (RAN) programs and/or communications. The processor 1418 may perform security operations such as authentication, security key agreement, and/or cryptographic operations, such as at the access-layer and/or application layer for example.

In an example embodiment, the WTRU 1402 comprises a processor 1418 and memory coupled to the processor. The memory may comprise executable instructions that when executed by the processor cause the processor to effectuate operations associated with locally performing functions of an OpenID protocol.

The transmit/receive element 1422 may be configured to transmit signals to, or receive signals from, a base station (e.g., the base station 1414a) over the air interface 1416. For example, in an embodiment, the transmit/receive element 1422 may be an antenna configured to transmit and/or receive RF signals. In an embodiment, the transmit/receive element 1422 may be an emitter/detector configured to transmit and/or receive IR, UV, or visible light signals, for example. In yet an embodiment, the transmit/receive element 1422 may be configured to transmit and receive both RF and light signals. It will be appreciated that the transmit/receive element 1422 may be configured to transmit and/or receive any combination of wireless signals.

In addition, although the transmit/receive element 1422 is depicted in FIG. 12B as a single element, the WTRU 1402 may include any number of transmit/receive elements 1422. More specifically, the WTRU 1402 may employ MIMO technology. Thus, in an embodiment, the WTRU 1402 may include two or more transmit/receive elements 1422 (e.g., multiple antennas) for transmitting and receiving wireless signals over the air interface 1416.

The transceiver 1420 may be configured to modulate the signals that are to be transmitted by the transmit/receive element 1422 and to demodulate the signals that are received by the transmit/receive element 1422. As noted above, the WTRU 1402 may have multi-mode capabilities. Thus, the transceiver 1420 may include multiple transceivers for enabling the WTRU 1402 to communicate via multiple RATs, such as UTRA and IEEE 802.11, for example.

The processor 1418 of the WTRU 1402 may be coupled to, and may receive user input data from, the speaker/microphone 1424, the keypad 1426, and/or the display/touchpad 1428 (e.g., a liquid crystal display (LCD) display unit or organic light-emitting diode (OLED) display unit). The processor 1418 may also output user data to the speaker/microphone 1424, the keypad 1426, and/or the display/touchpad 1428. In addition, the processor 1418 may access information from, and store data in, any type of suitable memory, such as the non-removable memory 1430 and/or the removable memory 1432. The non-removable memory 1430 may include random-access memory (RAM), read-only memory (ROM), a hard disk, or any other type of memory storage device. The removable memory 1432 may include a subscriber identity module (SIM) card, a memory stick, a secure digital (SD) memory card, and the like. In other embodiments, the processor 1418 may access information from, and store data in, memory that is not physically located on the WTRU 1402, such as on a server or a home computer (not shown).

The processor 1418 may receive power from the power source 1434, and may be configured to distribute and/or control the power to the other components in the WTRU 1402. The power source 1434 may be any suitable device for powering the WTRU 1402. For example, the power source 1434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1418 may also be coupled to the GPS chipset 1436, which may be configured to provide location information (e.g., longitude and latitude) regarding the current location of the WTRU 1402. In addition to, or in lieu of, the information from the GPS chipset 1436, the WTRU 1402 may receive location information over the air interface 1416 from a base station (e.g., base stations 1414a, 1414b) and/or determine its location based on the timing of the signals being received from two or more nearby base stations. It will be appreciated that the WTRU 1402 may acquire location information by way of any suitable location-determination method while remaining consistent with an embodiment.

The processor 1418 may further be coupled to other peripherals 1438, which may include one or more software and/or hardware modules that provide additional features, functionality and/or wired or wireless connectivity. For example, the peripherals 1438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 12C:
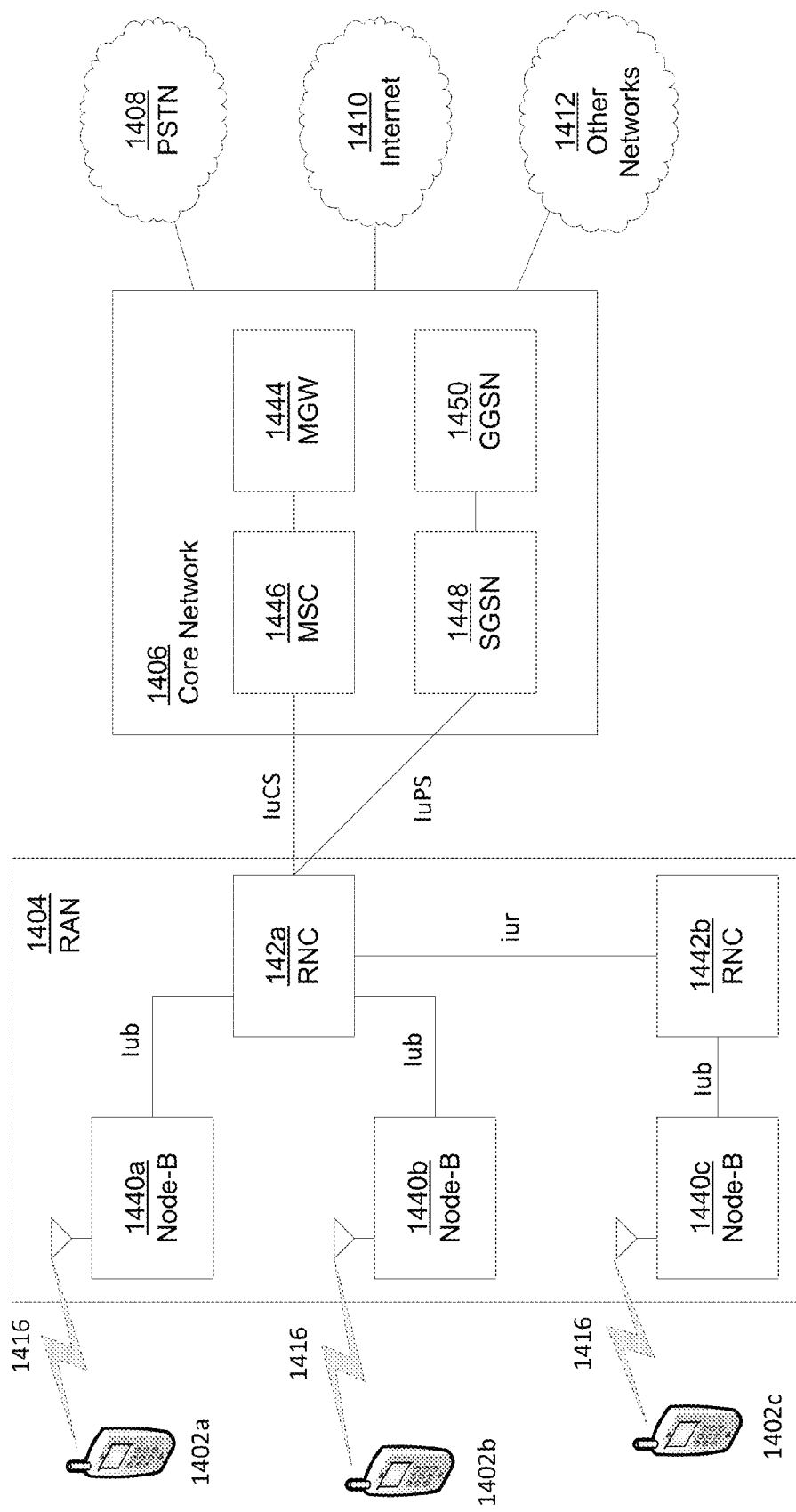
FIG. 12C is a system diagram of an example radio access network and an example core network that may be used within the communications system illustrated in FIG. 12A.

FIG. 12C is a system diagram of the RAN 1404 and the core network 1406 according to an embodiment. As noted above, the RAN 1404 may employ a UTRA radio technology to communicate with the WTRUs 1402a, 1402b, 1402c over the air interface 1416. The RAN 1404 may also be in communication with the core network 1406. As shown in FIG. 12C, the RAN 1404 may include Node-Bs 1440a, 1440b, 1440c, which may each include one or more transceivers for communicating with the WTRUs 1402a, 1402b, 1402c over the air interface 1416. The Node-Bs 1440a, 1440b, 1440c may each be associated with a particular cell (not shown) within the RAN 1404. The RAN 1404 may also include RNCs 1442a, 1442b. It will be appreciated that the RAN 1404 may include any number of Node-Bs and RNCs while remaining consistent with an embodiment.

As shown in FIG. 12C, the Node-Bs 1440a, 1440b may be in communication with the RNC 1442a. Additionally, the Node-B 1440c may be in communication with the RNC 1442b. The Node-Bs 1440a, 1440b, 1440c may communicate with the respective RNCs 1442a, 1442b via an Iub interface. The RNCs 1442a, 1442b may be in communication with one another via an Iur interface. Each of the RNCs 1442a, 1442b may be configured to control the respective Node-Bs 1440a, 1440b, 1440c to which it is connected. In addition, each of the RNCs 1442a, 1442b may be configured to carry out and/or support other functionality, such as outer loop power control, load control, admission control, packet scheduling, handover control, macrodiversity, security functions, data encryption, and the like.

The core network 1406 shown in FIG. 12C may include a media gateway (MGW) 1444, a mobile switching center (MSC) 1446, a serving GPRS support node (SGSN) 1448, and/or a gateway GPRS support node (GGSN) 1450. While each of the foregoing elements are depicted as part of the core network 1406, it will be appreciated that any one of these elements may be owned and/or operated by an entity other than the core network operator.

The RNC 1442a in the RAN 1404 may be connected to the MSC 1446 in the core network 1406 via an IuCS interface. The MSC 1446 may be connected to the MGW 1444. The MSC 1446 and the MGW 1444 may provide the WTRUs 1402a, 1402b, 1402c with access to circuit-switched networks, such as the PSTN 1408, to facilitate communications between the WTRUs 1402a, 1402b, 1402c and traditional land-line communications devices.

The RNC 1442a in the RAN 1404 may also be connected to the SGSN 1448 in the core network 1406 via an IuPS interface. The SGSN 1448 may be connected to the GGSN 1450. The SGSN 1448 and the GGSN 1450 may provide the WTRUs 1402a, 1402b, 1402c with access to packet-switched networks, such as the Internet 1410, to facilitate communications between and the WTRUs 1402a, 1402b, 1402c and IP-enabled devices.

As noted above, the core network 1406 may also be connected to the networks 1412, which may include other wired or wireless networks that are owned and/or operated by other service providers.

Although features and elements are described above in particular combinations, one of ordinary skill in the art will appreciate that each feature or element can be used alone or in any combination with the other features and elements. Additionally, one of ordinary skill in the art will appreciate that the embodiments described herein are provided for exemplary purposes only. For example, while embodiments may be described herein using a local OpenID identity provider (OP), an non-local OP or external OP may be used to perform similar functions, and vice versa. Furthermore, the embodiments described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for implementing identity management within a system comprising a user equipment (UE), an identity provider (IdP), and a service provider (SP) which communicate via a network, wherein the UE comprises a processor, the method comprising:
   receiving, by the UE comprising the processor, a request for at least one token, wherein the request for the at least one token is responsive to a request for access to a service provided by the service provider;
   receiving, by the UE comprising the processor, an authorization request to create an access token for the SP, wherein the authorization request is approved by a user of the UE;
   in response to the authorization request, at the UE, creating the access token, wherein the access token is associated with the user approval of the authorization request;
   issuing, by the UE, an identity (ID) token in accordance with the request for at least one token, such that the ID token is verified to provide the UE access to the service;
   issuing, by the UE, the access token; and
   releasing, by a user information endpoint that resides on the UE, a user attribute if the access token is verified.

2. The method as recited in claim 1, wherein the ID token is created securely in a trusted environment that resides within the UE.

3. The method as recited in claim 1, wherein the user approval of the authorization request is received automatically via a policy of the UE.

4. The method as recited in claim 1, wherein the access token comprises information indicative of a location of the user information endpoint, wherein the user information endpoint provides a requested user attribute to the SP upon a verification of the access token.

5. The method as recited in claim 4, wherein the verification of the access token comprises a verification that the user consented to a release of the requested user attribute to the SP.

6. The method as recited in claim 4, wherein the access token is created securely in a trusted environment that resides within the UE, and wherein the verification of the access token comprises a verification that the trusted environment is valid.

7. The method as recited in claim 1, wherein the ID token and the access token are created in accordance with an OpenID Connect protocol.

8. The method as recited in claim 1, wherein the ID token and the access token are created securely in a trusted environment that resides within the UE, the method further comprising:
determining an authentication status of the user with the trusted module; and
if the authentication status indicates that the user is not authenticated, authenticating the user at the trusted environment.

9. The method as recited in claim 1, wherein the access token is a first access token, the method further comprising:
based on the authorization request, at the UE, creating the first access token and a second access token, the access tokens associated with the service and the user.

10. The method as recited in claim 9, wherein the user information endpoint is a first user information endpoint and the first access token comprises information indicative of a location of the first user information endpoint that provides a first requested user attribute to the SP upon a verification of the first access token, and the second access token comprises information indicative of a location of a second user information endpoint that provides a second requested user attribute to the SP upon a verification of the second access token, and wherein the first user information endpoint is located on the UE and the second user information endpoint is located on a network entity that communicates with the SP via the network.

11. The method as recited in claim 10, wherein the first requested user attribute provided by the first user information endpoint is classified as confidential data by the user, and the second requested user attribute provided by the second user information endpoint is classified as nonconfidential data by the user.

12. The method as recited in claim 2, wherein the SP is an OpenID Connect client and the trusted environment is a local OpenID identity provider (OP).

13. A wireless/transmit receive unit (WTRU) comprising:
a memory comprising executable instructions; and
a hardware processor in communications with the memory to execute the instructions, such that the processor is configured to:
receive a request for at least one token, wherein the request for the at least one token is responsive to a request for access to a service provided by a service provider (SP);
receive an authorization request to create an access token for the SP, wherein the authorization request is approved by a user of the WTRU;
in response to the authorization request, create the access token, wherein the access token is associated with the user approval of the authorization request;
issue the identity (ID) token in accordance with the request for the at least one token, wherein the ID token is verified to provide the WTRU access to the service;
issue the access token; and
release, by a user information endpoint that resides on the WTRU, a user attribute if the access token is verified.

14. The WTRU as recited in claim 13, wherein the access token comprises information indicative of the location of the user information endpoint, wherein the user information endpoint provides the requested user attribute to the SP upon a verification of the access token.

15. The WTRU as recited in claim 14, wherein the verification of the access token comprises a verification that the user consented to a release of the requested user attribute to the SP.

16. The WTRU as recited in claim 13, wherein the access token is a first access token and the processor is further configured to:
based on the authorization request, at the WTRU, create the first access token and a second access token, the access tokens associated with the service and the user.

17. The WTRU as recited in claim 16, wherein the user information endpoint is a first user information endpoint and the first access token comprises information indicative of the location of a first user information endpoint that provides a first requested user attribute to the SP upon a verification of the first access token, and the second access token comprises information indicative of a location of a second user information endpoint that provides a second requested user attribute to the SP upon a verification of the second access token, and wherein the first user information endpoint is located on the WTRU and the second user information endpoint is located on a network entity that communicates with the SP via a network.

18. The method as recited in claim 1, the method further comprising:
receiving, by the UE, the access token.

19. The WTRU as recited in claim 13, wherein the processor is further configured to receive the access token.

* * * * *